(12) United States Patent
Li et al.

(10) Patent No.: US 12,425,934 B2
(45) Date of Patent: Sep. 23, 2025

(54) CELL SELECTION OR RESELECTION METHOD, INFORMATION TRANSMISSION METHOD AND APPARATUSES

(71) Applicant: FUJITSU LIMITED, Kawasaki (JP)

(72) Inventors: Guorong Li, Beijing (CN); Meiyi Jia, Beijing (CN); Yang Lu, Beijing (CN); Lei Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 318 days.

(21) Appl. No.: 18/100,018

(22) Filed: Jan. 23, 2023

(65) Prior Publication Data

US 2023/0156538 A1    May 18, 2023

Related U.S. Application Data

(63) Continuation of application No. PCT/CN2020/107565, filed on Aug. 6, 2020.

(51) Int. Cl.
 *H04W 48/12* (2009.01)
 *H04W 36/00* (2009.01)
(52) U.S. Cl.
 CPC . *H04W 36/0061* (2013.01); *H04W 36/00835* (2018.08)
(58) Field of Classification Search
 CPC ....... H04W 36/0061; H04W 36/00835; H04W 48/12; H04W 48/10; H04W 48/20
 See application file for complete search history.

(56) References Cited

U.S. PATENT DOCUMENTS

| | | | | |
|---|---|---|---|---|
| 2015/0264618 A1* | 9/2015 | Jung | ................... | H04W 36/302 455/436 |
| 2021/0092621 A1* | 3/2021 | Shih | ...................... | H04W 48/20 |
| 2021/0099924 A1* | 4/2021 | Shih | .................. | H04W 36/0061 |
| 2021/0227451 A1* | 7/2021 | Babaei | .................. | H04W 76/27 |
| 2021/0266809 A1 | 8/2021 | Chen et al. | | |
| 2023/0075764 A1 | 3/2023 | Liu | | |
| 2023/0300723 A1* | 9/2023 | Jose | ...................... | H04W 48/12 455/434 |
| 2024/0388998 A1* | 11/2024 | Agiwal | ................. | H04W 48/02 |

FOREIGN PATENT DOCUMENTS

| | | |
|---|---|---|
| CN | 110022594 A | 7/2019 |
| CN | 111132254 A | 5/2020 |
| CN | 111345072 A | 6/2020 |

(Continued)

OTHER PUBLICATIONS

Notice of Reasons for Refusal issued by the Japan Patent Office for corresponding Japanese Patent Application No. 2023-506264, mailed on Dec. 19, 2023, with an English translation.

(Continued)

*Primary Examiner* — Barry W Taylor
(74) *Attorney, Agent, or Firm* — Myers Wolin, LLC

(57) ABSTRACT

A cell selection or reselection method, an information transmission method and apparatuses. The cell selection or reselection method includes: acquiring cell information by a terminal equipment, determining whether a first cell and/or a frequency of the first cell is/are a candidate cell and/or a candidate frequency in a process of cell selection and/or cell reselection of a reduced capability terminal equipment.

14 Claims, 8 Drawing Sheets

(56) References Cited

FOREIGN PATENT DOCUMENTS

CN            111345075 A      6/2020
EP             2 117 274 A1    11/2009

OTHER PUBLICATIONS

International Search Report and Written Opinion of the International Searching Authority issued by the China National Intellectual Property Administration for corresponding International Patent Application No. PCT/CN2020/107565, mailed on Apr. 26, 2021, with an English translation.
Huawei et al., "Other aspects for reduced capability devices", Agenda Item: 8.3.4, 3GPP TSG-RAN WG1 Meeting #101-e, R1-2004612, E-meeting, May 25-Jun. 5, 2020.
Qualcomm Incorporated, "Considerations for Standardization Framework and Design Principles", Agenda Item: 8.3.4, 3GPP TSG-RAN WG1 Meeting #101, R1-2004496, e-Meeting, May 25-Jun. 5, 2020.
Ericsson, "Higher-layer aspects for Redcap", Agenda Item: 8.3.4, 3GPP TSG-RAN WG1 Meeting #101-e, R1-2003292, e-Meeting, May 25-Jun. 5, 2020.
3GPP TS 38.304 V16.0.0, "3rd Generation Partnership Project; Technical Specification Group Radio Access Network; NR; User Equipment (UE) procedures in Idle mode and RRC Inactive state (Release 16)", Mar. 2020.
First Notification of Office Action and Search Report issued by the China National Intellectual Property Administration for corresponding Chinese Patent Application No. 202080104493.7, mailed on Oct. 14, 2024, with an English translation.

\* cited by examiner

CELL SELECTION OR RESELECTION METHOD, INFORMATION TRANSMISSION METHOD AND APPARATUSES

CROSS-REFERENCE TO RELATED APPLICATION

This application is a continuation application of International Application PCT/CN2020/107565 filed on Aug. 6, 2020 and designated the U.S., the entire contents of which are incorporated herein by reference.

TECHNICAL FIELD

This disclosure relates to the field of communication technologies.

BACKGROUND

In the fifth generation (5G) communication technology, service transmission may be performed between network devices and terminal equipments. For example, such services may include but are not limited to: enhanced mobile broadband (eMBB), massive machine type communication (mMTC), and high-reliable and low-latency communication (URLLC), etc.

In addition, 5G may also support use cases in many vertical industries, such as devices in industrial environments (such as industrial network wireless sensors) connected to 5G wireless access and core networks, and data transmission of surveillance cameras and wearable devices in smart city innovation, including smart watches, bracelets, health related devices and medical monitoring devices, etc.

Characteristics of the above use cases are that device costs and complexities are lower than those of high-end eMBB and URLLC devices of current standard versions, especially industrial network wireless sensors. Furthermore, requirements on most use cases are that standard designs need to support devices with relatively small sizes, low service rate requirements, and specific use cases require that devices have relatively long battery lives.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY

At present, the 3rd Generation Partnership Project (3GPP) supports studies of characteristics and parameters of a reduced capability (RedCap) terminal equipment (hereinafter referred to as a UE). The RedCap UE may cover the terminal equipments in the above three use cases, and has lower capabilities than the eMBB and URLLC in the current standard version.

It was found by the inventors that as these reduced capability terminal equipments may possibly only support 1-2 transceiver antennas and/or limited bandwidths, if a large number of cells supporting RedCap UEs are deployed, network capacities and performances will be lost. Therefore, in order to avoid loss of network capacities and performances, the cells need to limit access of RedCap UEs. Currently, there is no method proposed to support or limit access of RedCap UEs to a cell.

In addition, when an RedCap UE and a non-RedCap UE coexist in a network, no method is currently proposed to distinguish access of RedCap UEs and non-RedCap UEs.

In order to solve at least one of the above problems, embodiments of this disclosure provide a cell selection or reselection method, an information transmission method and apparatuses thereof.

According to an aspect of the embodiments of this disclosure, there is provided a cell selection or reselection method, including:

acquiring cell information by a terminal equipment; and
determining by the terminal equipment whether a first cell and/or a frequency of the first cell is/are a candidate cell and/or a candidate frequency in a process of cell selection and/or cell reselection of a reduced capability terminal equipment.

According to another aspect of the embodiments of this disclosure, there is provided a cell selection or reselection apparatus, applicable to a terminal equipment, the apparatus including:

an acquiring unit configured to acquire cell information; and
a determining unit configured to determine whether a first cell and/or a frequency of the first cell is/are a candidate cell and/or a candidate frequency in a process of cell selection and/or cell reselection of a reduced capability terminal equipment.

According to a further aspect of the embodiments of this disclosure, there is provided an information transmission method, including:

generating cell information by a network device, the cell information being used by a terminal equipment to determine whether a first cell and/or a frequency of the first cell is/are a candidate cell and/or a candidate frequency in a process of cell selection and/or cell reselection of a reduced capability terminal equipment; and
transmitting the cell information by the network device.

According to still another aspect of the embodiments of this disclosure, there is provided an information transmission apparatus, applicable to a network device, the apparatus including:

a generating unit configured to generate cell information, the cell information being used by a terminal equipment to determine whether a first cell and/or a frequency of the first cell is/are a candidate cell and/or a candidate frequency in a process of cell selection and/or cell reselection of a reduced capability terminal equipment; and
a transmitting unit configured to transmit the cell information.

An advantage of the embodiments of this disclosure exists in that the terminal equipment may determine whether the cell and/or the frequency of the cell is/are a candidate cell and/or a candidate frequency in the cell selection and/or cell reselection process of the reduced capability terminal equipment according to the existing cell information or improved cell information. Thus, during the cell selection and/or cell reselection process, by indicating that the cell supports or restricts the access of the reduced capability terminal equipment (RedCap UE) to a cell for the access state of the reduced capability terminal equipment, it may be helpful to avoid congestion caused by the access and connection of a large number of reduced capability terminal equipments, maintain network capabilities, and provide good services to other conventional terminal equipments.

Another advantage of the embodiments of this disclosure exists in that when the reduced capability terminal equipment and non-reduced capability terminal equipment (such as a conventional capability terminal equipment) coexist in the network, the access of reduced capability terminal equipment and non-reduced capability terminal equipment may be distinguished, which is convenient for the network operator to restrict the access of the reduced capability terminal equipment (for example, the network operator may set a cell and/or frequency to be only providing services related to the terminal with conventional capabilities) or restrict the access of the conventional capability terminal equipment (for example, the network operator may set a cell and/or frequency to be only providing services specifically for the communication of the reduced capability terminal equipment (such as an industrial wireless sensor)). In addition, the operations are simple and behaviors of existing conventional terminal equipments are not affected.

A further advantage of the embodiments of this disclosure exists in that by configuring specific parameters for the reduced capability terminal equipment (such as determining relevant parameters of a suitable cell), determination results of the cell selection and/or reselection (such as whether it is a suitable cell) of the reduced capability terminal equipment may be distinguished from determination results of the cell selection and/or reselection of the conventional capability terminal equipment, thereby achieving the goal of restricting access to the cell or normally camping on the cell by the reduced capability terminal equipment.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiments.

DETAILED DESCRIPTION

Figure 1:
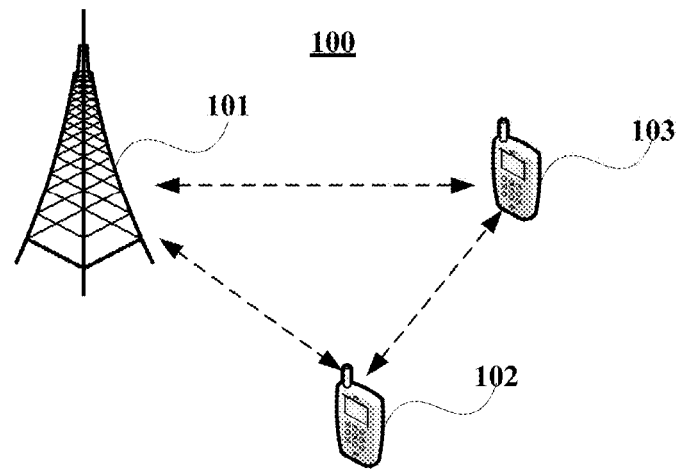
FIG. 1 is schematic diagram of a communication system of an embodiment of this disclosure.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station or a core network device, and may include one or more network devices described above. The term "user side" or "terminal side" or "terminal equipment side" refers to a side of a user or a terminal, which may be a UE, and may include one or more terminal equipments described above. "Device" may refer to a network device, or may refer to a terminal equipment.

In the embodiments of this disclosure, "allow", "not barred" and "support" may be interchangeable in use, and "not allowed", "barred" and "not support" may be interchangeable in use.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, the communication system 100 may include a network device 101 and terminal equipments 102, 103. For the sake of simplicity, an example having only two terminal equipments and one network device is schematically given in FIG. 1; however, the embodiments of this disclosure is not limited thereto.

In the embodiments of this disclosure, existing services or services that may be implemented in the future may be performed between the network device 101 and the terminal equipments 102, 103. For example, such services may include but not limited to an enhanced mobile broadband (eMBB), massive machine type communication (mMTC), ultra-reliable and low-latency communication (URLLC), and related communications of reduced capability terminal equipments, etc.

It should be noted that FIG. 1 shows that two terminal equipments 102, 103 are both within coverage of the network device 101. However, this disclosure is not limited thereto, and the two terminal equipments 102, 103 may not be within the coverage of the network device 101, or one terminal equipment 102 is within the coverage of the network device 101 and the other terminal equipment 103 is outside the coverage of the network device 101.

Figure 2:
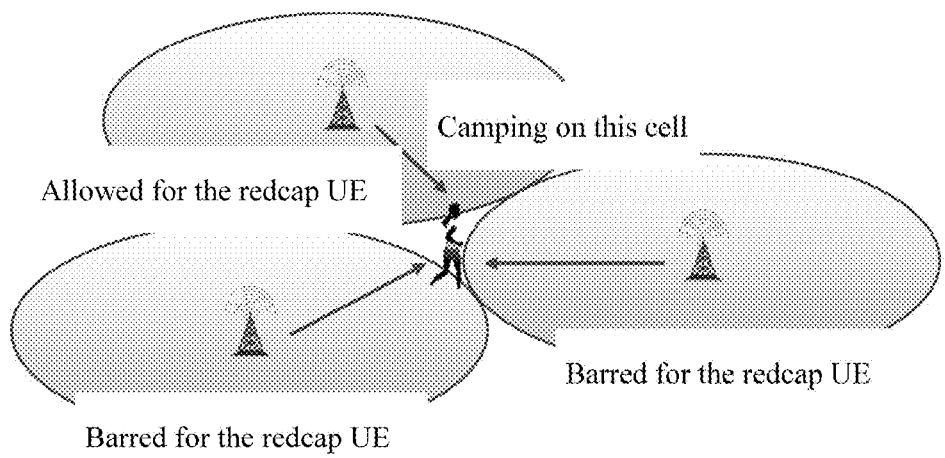
FIG. 2 is a schematic diagram of a scenario of cell access of an embodiment of this disclosure.

FIG. 2 is a schematic diagram of a scenario of cell access of an embodiment of this disclosure. A terminal equipment judges an access state of a cell during a process of power on, returning to a service area, entering an idle/inactive state from a connected state, or cell reselection, so as to determine whether to camp on or in what way to camp on the cell. As shown in FIG. 2, the terminal equipment searches signals of three cells in the process of cell selection and/or reselection, and needs to judge whether the three cells support selection and/or reselection or access or camping by the UE. The embodiments of this disclosure proposes a cell selection or reselection method, in which a terminal equipment may determine whether a cell and/or a frequency of the cell is/are a candidate cell and/or a candidate frequency in the cell selection and/or cell reselection process of the reduced capability terminal equipment according to existing cell information or improved cell information. In this way, during the cell selection and/or cell reselection process, by indicating that the cell supports or restricts the access of the reduced capability terminal equipment (RedCap UE) to a cell for the access state of the reduced capability terminal equipment, it may be helpful to avoid congestion caused by the access and connection of a large number of reduced capability terminal equipments, maintain network capabilities, and provide good services to other conventional terminal equipments. In addition, when the reduced capability terminal equipment and non-reduced capability terminal equipment (such as a conventional capability terminal equipment) coexist in the network, the access of reduced capability terminal equipment and non-reduced capability terminal equipment may be distinguished, which is convenient for the network operator to restrict the access of the reduced capability terminal equipment (for example, the network operator may set a cell and/or frequency to be only providing services related to the terminal with conventional capabilities) or restrict the access of the conventional capability terminal equipment (for example, the network operator may set a cell and/or frequency to be only providing services specifically for the communication of the reduced capability terminal equipment (such as an industrial wireless sensor)). In addition, the operations are simple and behaviors of existing conventional terminal equipments are not affected. Following description shall be given with reference to the embodiments.

Embodiments of a First Aspect

The embodiments of this disclosure provide a cell selection or reselection method, which shall be described from a terminal equipment side. In the embodiments of this disclosure, the terminal equipment is a reduced capability terminal equipment.

Figure 3:
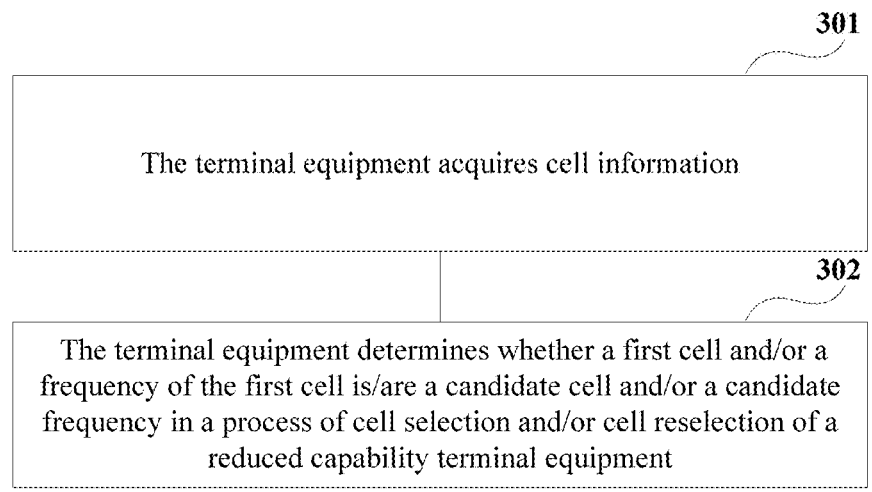
FIG. 3 is a schematic diagram of the cell selection or reselection method of an embodiment of this disclosure.

FIG. 3 is a schematic diagram of the cell selection or reselection method of the embodiment of this disclosure. As shown in FIG. 3, the method includes:
- 301: the terminal equipment acquires cell information; and
- 302: the terminal equipment determines whether a first cell and/or a frequency of the first cell is/are a candidate cell and/or a candidate frequency in a process of cell selection and/or cell reselection of a reduced capability terminal equipment.

It should be noted that FIG. 3 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 3.

Figure 4A:
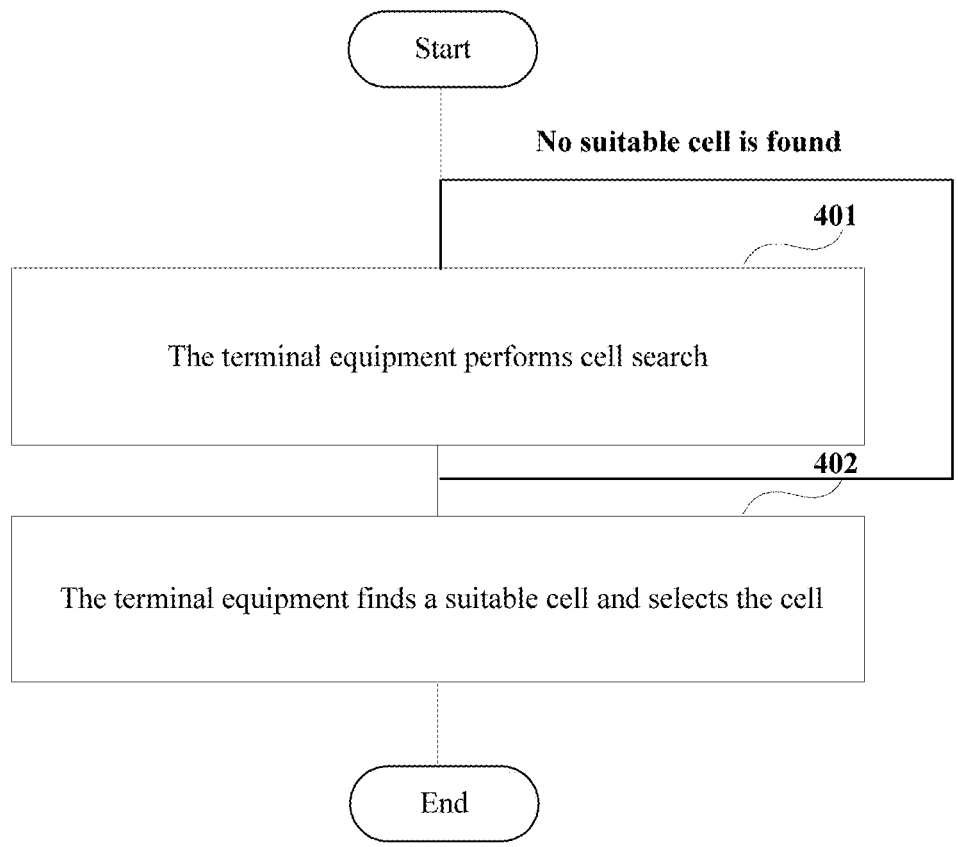
FIG. 4A is a schematic diagram of a cell selection method of the embodiment of this disclosure.

FIG. 4A is a schematic diagram of a cell selection method of the embodiment of this disclosure. As shown in FIG. 4A, the method includes:
- 401: the terminal equipment performs cell search; and
- 402: the terminal equipment finds a suitable cell and selects the cell, and turns back to 401 if no suitable cell is found.

Details shall be described below.

In some embodiments, the cell selection process includes an initial cell selection process and a cell selection process for storing information. The initial cell selection process includes scanning all radio frequency channels in a frequency band by the terminal equipment, performing cell search at each frequency by the terminal equipment (for example, the searched cells or frequencies may be regarded as candidate cells or candidate frequencies), when a suitable cell is found, selecting the cell by the terminal equipment. The cell selection process for storing information includes receiving and storing information on frequencies (and information on selectable cell parameters) from previous measurement configuration or from previously detected cells by the terminal equipment, preferentially performing cell search on these frequencies (for example, the searched cells or frequencies may be regarded as candidate cells or candidate frequencies) by the terminal equipment, when a suitable cell is found, selecting the cell by the terminal equipment, if no suitable cell is found, starting the initial cell selection process by the terminal equipment. The above suitable cell refers to a cell that at least satisfies a cell selection S standard and/or a cell that is not in a barred state and/or a cell with a PLMN belonging to a specific PLMN and/or a cell with a tracking area out of a barred tracking area list.

Figure 4B:
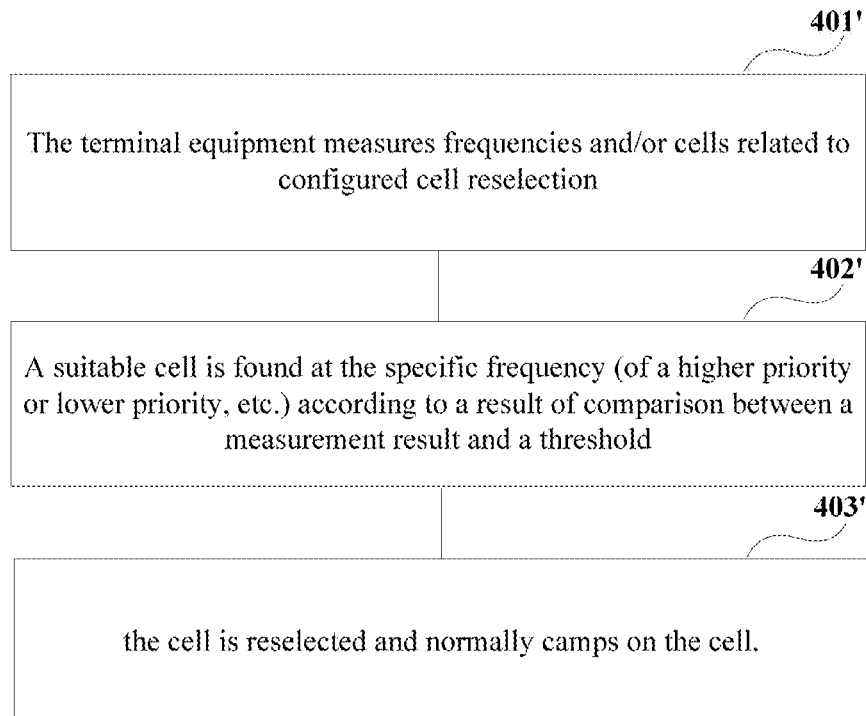
FIG. 4B is a schematic diagram of a cell reselection method of the embodiment of this disclosure.

FIG. 4B is a schematic diagram of a cell reselection method of the embodiment of this disclosure. As shown in FIG. 4B. The method includes:
- 401': the terminal equipment measures frequencies and/or cells related to configured cell reselection;
- 402': a suitable cell is found at the specific frequency (of a higher priority or lower priority, etc.) according to a result of comparison between a measurement result and a threshold; and
- 403': the cell is reselected and normally camps on the cell.

Details shall be described below.

In some embodiments, the cell reselection process includes a measurement process and a judgment process related to cell reselection. In the measurement process, if quality of a serving cell is lower than threshold 1, the terminal equipment performs intra-frequency measurement, and the measured cells (or the frequencies the cells) may be taken as candidate cells or candidate frequencies; and for inter-frequency measurement, if an inter-frequency reselection priority related to cell reselection configured by the network is higher than a reselection priority of a current service frequency, the terminal equipment performs measurement on the inter-frequency, and if the reselection priority of the inter-frequency related to cell reselection configured by the network is equal to or lower than the reselection priority of the current service frequency, the terminal equipment performs measurement on the inter-frequency when quality of the serving cell is lower than threshold 2, and the measured cells (or the frequencies of the cells) may be taken as candidate cells or candidate frequencies. During the judgment, if quality of a cell at an inter-frequency with a priority higher than that of the reselection at the current service frequency is greater than threshold 3, the terminal equipment performs reselection to the cell at the frequency of the higher priority; for intra-frequency cells and cells at a frequency with a reselection priority identical to the current service frequency, the cells are ordered according to the R criterion, and the terminal equipment performs reselection to a cell of a highest rank; and if quality of a cell at an inter-frequency with a lower priority than that of the reselection at the current service frequency is higher than threshold 4 and quality of the current serving cell is lower than threshold 5, the terminal equipment performs reselection to the cell at the frequency with a lower priority; wherein when the terminal equipment finds a suitable cell at the above specific frequency (with a higher priority or a lower priority, etc.), the terminal equipment reselects the cell and normally camps on the cell.

In some embodiments, candidate cells and/or candidate frequencies in the cell selection and/or cell reselection process of the reduced capability terminal equipment at least satisfy one of the following two conditions:
- A) a cell access state is indicated as allowed or not barred or supported or reserved for the reduced capability terminal equipment;
- B) a parameter value indicating quality of a cell satisfies a predetermined condition (S standard).

A determination order of A) and B) in no particular order, and following description shall be given with respect to the above two conditions.

For Condition A)

In some embodiments, whether a first cell and/or a frequency of the first cell is/are a candidate cell and/or a candidate frequency in the cell selection and/or cell reselection process of the reduced capability terminal equipment may be determined by explicitly or implicitly indicating an access state of a cell for the reduced capability terminal equipment by existing cell information or newly added cell information.

In some embodiments, first indication information may be newly defined in the cell information to explicitly indicate the access state of the cell and/or the frequency of the cell to the reduced capability terminal equipment. For example, the first indication information (cell barred for RedCap UE) is used to indicate that the first cell and/or the frequency of the first cell is/are in a barred state or unreserved state for the reduced capability terminal equipment, or the first indication information (cell allow/reserved for RedCap UE or RedCap support) is used to indicate that the first cell and/or the frequency of the first cell is/are in a supported or reserved state for the reduced capability terminal equipment.

In some embodiments, the first indication information is a newly added information element (IE) in the cell information, which may be represented by bits, the cell access states may be indicated by values of different bits, or the cell access states may also be indicated by presence or absence of the information element, which shall be described below by way of examples.

In some embodiments, when the cell information includes the first indication information, the cell access states may be indicated by values of different bits. For example, that a value of a bit is set to be 1 indicates that the first cell and/or the frequency of the first cell is/are in a barred state for the reduced capability terminal equipment, and that a value of a bit is set to be 0 indicates that the first cell and/or the frequency of the first cell is/are in a supported state for the reduced capability terminal equipment, and vice versa; or, that a value of a bit is set to be 1 indicates that the first cell and/or the frequency of the first cell is/are in a reserved state for the reduced capability terminal equipment, and that a value of a bit is set to be 0 indicates that the first cell and/or the frequency of the first cell is/are in an unreserved state for the reduced capability terminal equipment, and vice versa, which shall not enumerated herein any further.

In the above embodiments, when the first indication information indicates that the first cell and/or the frequency of the first cell is in a barred or unreserved state for the reduced capability terminal equipment, it is determined that the first cell and/or the frequency of the first cell is/are not a candidate cell and/or a candidate frequency in the process of cell selection and/or cell reselection of the reduced capability terminal equipment; and/or, when the first indication information indicates that the first cell and/or the frequency of the first cell is/are in an unbarred or supported or reserved state for the reduced capability terminal equipment, it is determined that the first cell and/or the frequency of the first cell is/are a candidate cell and/or a candidate frequency in the cell selection and/or cell reselection process of the reduced capability terminal equipment; and if the first indication information is not present in the cell information, the network device and terminal equipment default that the first cell and/or the frequency of the first cell is/are not a candidate cell and/or a candidate frequency in the cell selection and/or cell reselection process of the reduced capability terminal equipment, or the network device and terminal equipment default that the first cell and/or the frequency of the first cell is/are a candidate cell and/or a candidate frequency in the cell selection and/or cell reselection process of the reduced capability terminal equipment.

In some embodiments, the cell access states may be indicated by the presence or absence of the information element. For example, the presence of the information element (i.e. the cell information includes the first indication information) indicates that the first cell and/or the frequency of the first cell is/are in a barred state for the reduced capability terminal equipment, the absence of the information element (i.e. the cell information does not include the first indication information) indicates that the first cell and/or the frequency of the first cell is/are in a supported state for the reduced capability terminal equipment, and vice versa; or, the presence of the information element (i.e. the cell information includes the first indication information) indicates that the first cell and/or the frequency of the first cell is/are in a reserved state for the reduced capability terminal equipment, the absence of the information element (i.e. the cell information does not include the first indication information) indicates that the first cell and/or the frequency of the first cell is/are in an unreserved state for the reduced capability terminal equipment, and vice versa, which shall not enumerated herein any further.

In the above embodiments, when the cell information includes the first indication information (the information element is present) and the presence of the first indication information indicates that the first cell and/or the frequency of the first cell is in a barred or unreserved state for the reduced capability terminal equipment, it is determined that the first cell and/or the frequency of the first cell is/are not a candidate cell and/or a candidate frequency in the cell selection and/or cell reselection process of the reduced capability terminal equipment, or the first cell is excluded from the candidate cells of cell selection and/or cell reselection, and/or the frequency of the first cell is excluded from the candidate frequencies of cell selection and/or cell reselection; and when the cell information does not include the first indication information (the information element is not present), it is determined that the first cell and/or the frequency of the first cell is/are in an unbarred state to the reduced capability terminal equipment, and it is further determined that the first cell and/or the frequency of the first cell is/are a candidate cell and/or a candidate frequency in the cell selection and/or cell reselection process of the reduced capability terminal equipment, or, the first cell and/or the frequency of the first cell is/are not excluded from the candidate cells and/or the candidate frequencies of the cell selection and/or the cell reselection;

and vice versa, that is, when the cell information includes the first indication information (the information element is present) and the presence of the first indication information indicates that the first cell and/or the frequency of the first cell is/are in an unbarred or supported or reserved state for the reduced capability terminal equipment, it is determined that the first cell and/or the frequency of the first cell is/are a candidate cell and/or a candidate frequency in the cell selection and/or cell reselection process of the reduced capability terminal equipment, or the first cell and/or the frequency of the first cell is/are not excluded from the candidate cells and/or the candidate frequencies of the cell selection and/or the cell reselection; and when the cell information does not include the first indication information (the information element is not present), it is determined that the first cell and/or the frequency of the first cell is/are in a barred or unreserved state to the reduced capability terminal equipment, and the first cell and/or the frequency of the first cell is/are excluded from the candidate cells and/or the candidate frequencies of the cell selection and/or the cell reselection, that is, it is determined that the first cell and/or the frequency of the first cell is/are not a candidate cell and/or a candidate frequency in the cell selection and/or cell reselection process of the reduced capability terminal equipment, or the first cell is excluded from the candidate cells of the cell selection and/or the cell reselection, and/or the frequency of the first cell is excluded from the candidate frequencies of the cell selection and/or the cell reselection.

In some embodiments, relevant information of the reduced capability terminal equipment may be newly defined in the cell information to implicitly indicate the access state of the cell and/or the frequency of the cell to the reduced capability terminal equipment. For example, the relevant information includes at least one piece of access resource information of the reduced capability terminal equipment, system information related to the reduced capability terminal equipment, information indicating a relevant public land mobile network (PLMN) of the reduced capability terminal equipment, search space or control resource set information of the reduced capability terminal equipment, and bandwidth information of the reduced capability terminal equipment.

For example, the above access resource may be a physical random access (PRACH) resource or a randomly access message A (Msg. A) resource or a random access preamble, etc.; the above relevant PLMN may be a selected PLMN, or a registered PLMN, or an equivalent PLMN, or a home PLMN, etc., and/or information on a relevant tracking area, such as a tracking area code (TAC) or a tracking area identifier (TAI); the above system information related to the reduced capability terminal equipment may be system information dedicated to the reduced capability terminal equipment (such as SIB1 or specific on demand SI); the above search space or control resource set information may be a specific search space or control resource set for reception of system information or paging or a random access response of the reduced capability terminal equipment; and the above bandwidth information may be one or more of bandwidths supported by the reduced capability terminal equipment, which shall not be enumerated herein any further.

In the above embodiments, the cell access state may be implicitly indicated by the presence or absence of the relevant information. When the cell information includes the relevant information, it implicitly indicates that the first cell and/or the frequency of the first cell is in a supported state or a reserved state for the reduced capability terminal equipment, and it is further determined that the first cell and/or the frequency of the first cell is/are a candidate cell and/or a candidate frequency in the cell selection and/or cell reselection process of the reduced capability terminal equipment; and when the cell information not includes the relevant information, it implicitly indicates that the first cell and/or the frequency of the first cell is in a barred state or an unreserved state for the reduced capability terminal equipment, and it is further determined that the first cell and/or the frequency of the first cell is/are not a candidate cell and/or a candidate frequency in the cell selection and/or cell reselection process of the reduced capability terminal equipment.

In some embodiments, whether the first cell and/or the frequency of the first cell is/are a candidate cell and/or a candidate frequency in the process of cell selection and/or cell reselection of the reduced capability terminal equipment may be determined by indicating an access state for the reduced capability terminal equipment by existing cell information.

In some embodiments, the existing cell information includes at least one of the following information (information elements): second indication information (cellBarred), third indication information (cellReservedForOperatorUse), fourth indication information (cellReservedForOtherUse), and fifth indication information (cellReservedForFutureUse). The second indication information indicates whether the first cell and/or the frequency of the first cell is/are in a barred state, the third indication information indicates whether the first cell and/or the frequency of the first cell is/are reserved for use by the operator, the fourth indication information indicates whether the first cell and/or the frequency of the first cell is/are reserved for other uses, and the fifth indication information indicates whether the first cell and/or the frequency of the first cell is/are reserved for future use.

In some embodiments, one or more combinations of the above existing cell information may be used to indicate the cell access states for the reduced capability terminal equipment. Table 1 is an example of indicating the cell access states by using the above four pieces of indication information. Table 1 is an example only and is not intended to limit the embodiments of this disclosure.

TABLE 1

| Existing information elements | | | | Cell access states for the reduced capability terminal equipment |
| --- | --- | --- | --- | --- |
| cellBarred | cellReservedForOperatorUse | cellReservedForOtherUse | cellReservedForFutureUse | |
| Barred | — | — | — | Barred/Unreserved |
| Unbarred | Unreserved | Unreserved | Unreserved | Supported/Reserved |
| — | — | Reserved | — | Barred/Unreserved |
| — | — | — | Reserved | Supported/Reserved |

Optionally, the terminal equipment may also ignore the second indication information, the third indication information, the fourth indication information and the fifth indication information, and determine candidate cells and/or candidate frequencies according to the above first indication information or relevant information, which shall be described with reference to a third aspect of the embodiments.

In the above embodiments, when it is indicated that the first cell and/or the frequency of the first cell is in the supported or unreserved state for the reduced capability terminal equipment, it is determined that the first cell and/or the frequency of the first cell is/are a candidate cell and/or a candidate frequency in the cell selection and/or cell reselection process of the reduced capability terminal equipment; and when it is indicated that the first cell and/or the frequency of the first cell is in the barred or unreserved state for the reduced capability terminal equipment, it is determined that the first cell and/or the frequency of the first cell is/are not a candidate cell and/or a candidate frequency in the cell selection and/or cell reselection process of the reduced capability terminal equipment.

In some embodiments, when the first cell and/or the frequency of the first cell is/are explicitly or implicitly indicated to be in the supported or reserved state for the reduced capability terminal equipment as above, the terminal equipment needs further to determine a cell access state indicated by the existing second indication information, that is, the terminal equipment needs further to determine whether the first cell and/or the frequency of the first cell is/are a candidate cell and/or a candidate frequency in the process of cell selection and/or cell reselection of the reduced capability terminal equipment with reference to an indication result of the second indication information. For example, when the first cell and/or the frequency of the first cell is/are indicated to be in the supported or reserved state for the reduced capability terminal equipment and the second indication information indicates that the first cell and/or the frequency of the first cell is/are not in a barred state, the terminal equipment determines that the first cell and/or the frequency of the first cell is/are a candidate cell and/or a candidate frequency in the cell selection and/or cell reselection process of the reduced capability terminal equipment.

In addition, for a first type of non-reduced capability terminal equipment (such as the conventional UE specified in standard Version 15 or 16), when the first cell and/or the frequency of the first cell is/are explicitly or implicitly indicated to be in the reserved or unreserved state for the reduced capability terminal equipment as above, the first type of non-reduced capability terminal equipment may ignore the first indication information or relevant information, and according to provisions of the existing standards, determine with reference to the existing cell information whether the first cell and/or the frequency of the first cell is/are a candidate cell and/or a candidate frequency in a process of cell selection and/or cell reselection of the first type of non-reduced capability terminal equipment; and for a second type of non-reduced capability terminal equipment (such as the non-reduced capability terminal equipment specified in standard Version 17 or later), when the first cell and/or the frequency of the first cell is/are explicitly or implicitly indicated to be in the reserved state for the reduced capability terminal equipment as above, it is determined that the first cell and/or the frequency of the first cell is/are not a candidate cell and/or a candidate frequency in a process of cell selection and/or cell reselection of the second type of non-reduced capability terminal equipment, which shall be described in detail with reference to embodiments of a second aspect.

For Condition B)

In some embodiments, parameter values representing cell quality may be calculated by newly added cell information. For example, the cell information includes at least one of minimum received power, a minimum quality level, an offset and maximum transmission power configured for the reduced capability terminal equipment.

In the above embodiments, the terminal equipment may calculate the parameter values representing cell quality according to the above cell information, such as Srxlev and Square, and when the parameter values do not satisfy a predetermined condition (S standard), determine that the first cell and/or the frequency of the first cell is/are not a candidate cell and/or a candidate frequency of the cell selection and/or cell reselection.

For example, the S standard is: Srxlev>0 and Square>0

$$Srxlev = Q_{rxlevmeas} - (Q_{rxlevmin} + Q_{rxlevminoffset})$$
$$- P_{compensation} - Qoffset_{temp},$$

$$Squal = Q_{qualmeas} - (Q_{qualmin} + Q_{qualminoffset})$$
$$- Qoffset_{temp};$$

where, Srxlev denotes a cell selection reception level value, Square denotes cell selection quality, $Qoffset_{temp}$ denotes an offset temporarily applied by the cell, $Q_{rxlevmeas}$ denotes measured cell received power value, $Q_{rxlevmin}$ denotes a minimum required received power level (dBm) in the cell, $Q_{rxlevminoffset}$ denotes an offset to $Q_{rxlevmin}$ required in searching a PLMN with a high priority, and $P_{compensation}$ denotes compensation between uplink power and downlink power, which is related to maximum transmit power p-Max configured by the cell, $Q_{qualmeas}$ denotes measured cell quality, $Q_{qualmin}$ denotes a minimum required quality level (dB) in the cell, and $Q_{qualminoffset}$ denotes an offset to $Q_{qualmin}$ required in searching the PLMN with a high priority.

In the above embodiments, the cell information may include at least one of the minimum received power $Q_{rxlevmin}$ and/or offset $Q_{rxlevminoffset}$ and/or minimum quality level $Q_{qualmin}$ and/or offset $Q_{qualminoffset}$ and/or maximum transmit power p-Max configured for the reduced capability terminal equipment, and at least one of the above parameters may be configured to be specific to the reduced capability terminal equipment, that is, it is configured to be a value different from that of the conventional capability terminal equipment. In this way, by configuring the specific parameters (such as relevant parameters for determining a suitable cell) for the reduced capability terminal equipment, a determination result of the cell selection and/or reselection of the reduced capability terminal equipment (such as whether it is a suitable cell) may be distinguished from a determination result of cell selection and/or reselection of a conventional capability terminal equipment, thereby achieving the goal of restricting access to the cell or normally camping on the cell by the reduced capability terminal equipment.

In some embodiments, the first cell is a second cell to which the cell information corresponds and/or a cell other than the second cell, and the frequency of the first cell is a first frequency of the second cell and/or a frequency (inter-frequency) other than the first frequency. Wherein, the other cell includes at least one other cell, and the other frequency includes at least one other frequency. In other words, the terminal equipment acquires cell information of the second cell, the cell information including first indication information related to the second cell and/or a first frequency of the second cell or relevant information or information for calculating parameter values, and/or including first indication information related to other cells than the second cell or relevant information or information for calculating parameter values, and/or including first indication information related to other frequencies than the first frequency or relevant information or information for calculating parameter values, for example, the other cells may be neighboring cells of the second cell; wherein when the cell information includes information on multiple cells, it may be represented by a cell list or a frequency list. Table 2 is an example of the first indication information.

TABLE 2

| Frequency list | Cell access state for the RedCap UE |
|---|---|
| Frequency 1 | Supported |
| Frequency 2 | Unsupported |
| . . . | . . . |

Or, it is represented as a frequency list including supporting a RedCap UE:

FreqForRedCapList::=SEQUENCE (SIZE (1 . . . maxFreqRedCap)) OF ARFCN-ValueNR; that is, supported frequencies are enumerated;

and it may further be represented as a frequency list including unsupporting a RedCap UE:

FreqForBarredRedCapList::=SEQUENCE (SIZE (1 . . . maxFreqBarredRedCap)) OF ARFCN-ValueNR; that is, unsupported frequencies are enumerated.

In some embodiments, the above cell information may further include a newly added first intra-frequency reselection parameter specific to the reduced capability terminal equipment. For example, an information element of the newly added first intra-frequency reselection parameter may be expressed as intraFreqReselection and is used to indicate whether the reduced capability terminal equipment is allowed to perform intra-frequency reselection. For example, in the process of cell selection and/or reselection, if this parameter is set to be allowed, when an access state of the current cell is indicated to be in a barred state for the reduced capability terminal equipment, the terminal equipment may select another cell at the same frequency as a current cell. If this parameter is set to be not allowed, when an access state of the current cell is indicated to be in a barred state for the reduced capability terminal equipment, the terminal equipment determines that another cell at the same frequency as the current cell is also barred, or does not reselect another cell at the same frequency.

In some embodiments, the above cell information may include an existing second intra-frequency reselection parameter. For example, an information element of the second intra-frequency reselection parameter may be expressed as intraFreqReselection, which is used to indicate whether the terminal equipment is allowed to perform intra-frequency reselection. The second intra-frequency reselection parameter is configured for the first type of non-reduced capability terminal equipment, and the reduced capability terminal equipment may ignore the second intra-frequency reselection parameter when performing cell selection and/or reselection.

In some embodiments, the above cell information may be carried by system information. The system information includes a master information block (MIB) or system information block type 1 (SIB1), or RedCap-specific system information, etc.; that is, the terminal equipment acquires the above cell information via the system information broadcasted by the network device.

In some embodiments, the cell information may further be included in a random access response (RAR) message or a radio resource control (RRC) reject message. For example, in a random access procedure, the reduced capability terminal equipment requests access via a random access preamble (i.e. transmitting Msg1), and the network device transmits a random access response (i.e. transmitting Msg2); wherein the cell information is indicated in a sub-header of an MAC sub-protocol data unit (sub-PDU) of Msg2 or in the RAR; or, after the reduced capability terminal equipment transmits Msg3 (such as an RRC request or an RRC resume request), the cell information is included in the RRC reject message transmitted by the network device.

In some embodiments, the above cell information is common for PLMN or specific for PLMN, that is, common cell information may be configured for each PLMN, or the above cell information may be respectively configured for each PLMN.

In some embodiments, the cell information corresponds to a type or use scenario of the reduced capability terminal equipment, that is, the cell information is configured respectively for each type or use scenario of reduced capability terminal equipment, wherein the cell information to which at least one type or use scenario of reduced capability terminal equipment corresponds is identical or different. Therefore, different access states of cells and/or frequencies of the cells may be provided for different use cases or types of reduced capability terminal equipments, so that the network operator may distinguish or restrict access of reduced capability terminal equipments of different types (or different capabilities or different levels), thereby serving for different application scenarios (such as industrial wireless sensor networks, surveillance cameras, and wearable devices, etc.).

For example, for types or use scenarios of industrial wireless sensors, especially for security-related sensors, a required communication service availability is more than 99.99%, that is, it is necessary to ensure access of these devices as much as possible. Therefore, one type of cell information may be set for this type or use scenario, and another type of cell information may be set for other types or use scenarios; or, different cell information may be set respectively for each type or use scenario, and the embodiments of this disclosure is not limited thereto.

In some embodiments, the above determining the cell or frequency is/are a candidate cell and/or a candidate frequency may be deemed as that the cell may be accessed, or may be deemed as that the cell is not barred, or may be deemed as that the cell is a suitable cell, or may be deemed as that the cell may be normally camped on, or may be deemed as that the cell and/or the frequency may be selected and/or reselected; and the above non-candidate cell and/or non-candidate frequency may further be considered as that the cell is barred, or may be deemed as an unsuitable cell, or may be deemed as an acceptable cell, or may be deemed as that the cell is camped on temporarily, or may not be reselected cell and/or frequency, or may be excluded from candidates of the cell selection and/or cell reselection, or may be excluded from candidates of the cell selection and/or cell reselection for a predetermined period of time (such as 300 seconds). Such expressions are not limited in the embodiments of this disclosure.

In some embodiments, in the process of cell selection and/or reselection performed by the reduced capability terminal equipment, only when searched or measured cells and/or frequencies are deemed as candidate cells and/or candidate frequencies, that is, the cells and/or the frequencies are deemed as being in a unbarred or reserved state for the reduced capability terminal equipment, searched or measured cells and/or frequencies may possibly be selected and/or reselected by the reduced capability terminal equipment as suitable/acceptable cells. In other words, the suitable/acceptable cells found in the process of cell selection and/or reselection must not be cells in a barred or unreserved state for the reduced capability terminal equipment.

In some embodiments, before determining a candidate cell and/or a candidate frequency, the process of cell selection further includes: the terminal equipment performs cell search, and searches for at least two third cells with strongest signals, or determines a fourth cell with reference signal received power (RSRP) higher than a threshold; and the terminal equipment acquires cell information transmitted by the third cell or the fourth cell. What is different from the prior art is that the terminal equipment does not search for a cell with one strongest signal, but searches for multiple cells with the strongest signals or selects cells with RSRP higher than the threshold. Hence, a probability of selecting cells that support the reduced capability the terminal equipment may be increased.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that the terminal equipment may determine whether the cell and/or the frequency of the cell is a candidate cell and/or a candidate frequency in the cell selection and/or cell reselection process of the reduced capability terminal equipment according to the existing cell information or improved cell information. Thus, during the cell selection and/or cell reselection process, by indicating that the cell supports or restricts the access of the reduced capability terminal equipment (RedCap UE) to a cell for the access state of the reduced capability terminal equipment, it may be helpful to avoid congestion caused by the access and connection of a large number of reduced capability terminal equipments, maintain network capabilities, and provide good services to other conventional terminal equipments.

Furthermore, when the reduced capability terminal equipment and non-reduced capability terminal equipment (such as a conventional capability terminal equipment) coexist in the network, the access of reduced capability terminal equipment and non-reduced capability terminal equipment may be distinguished, which is convenient for the network operator to restrict the access of the reduced capability terminal equipment (for example, the network operator may set a cell and/or frequency to be only providing services related to the terminal with conventional capabilities) or restrict the access of the conventional capability terminal equipment (for example, the network operator may set a cell and/or frequency to be only providing services specifically for the communication of the reduced capability terminal equipment (such as an industrial wireless sensor). In addition, the operations are simple and behaviors of existing conventional terminal equipments are not affected.

Embodiments of a Second Aspect

The embodiments of this disclosure provide an information transmission method, which shall be described from a network device side, with contents identical to those in the embodiments of the first aspect being not going to be described herein any further.

Figure 5:
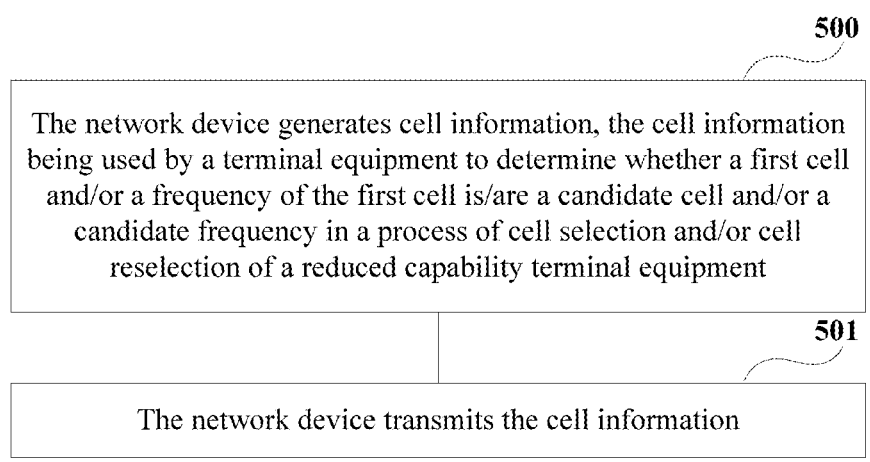
FIG. 5 is a schematic diagram of the information transmission method of an embodiment of this disclosure.

FIG. 5 is a schematic diagram of the information transmission method of the embodiment of this disclosure. As shown in FIG. 5, the method includes:
  501: the network device transmits cell information, the cell information being used by a terminal equipment to determine whether a first cell and/or a frequency of the first cell is/are a candidate cell and/or a candidate frequency in a process of cell selection and/or cell reselection of a reduced capability terminal equipment.

In some embodiments, the network device transmits the cell information via system information, or includes the cell information in a random access response (RAR) message or a radio resource control (RRC) reject message to transmit to the terminal equipment. Reference may be made to the embodiments of the first aspect for implementation of the cell information, and repeated part shall not be described any further.

In some embodiments, the method may further include (optional):
  500: the network device generates the cell information.

In some embodiments, the network device generates cell information corresponding to a type or use scenario of the reduced capability terminal equipment according to the type or use scenario of the reduced capability terminal equipment. The cell information to which at least one type or use scenario of the reduced capability terminal equipment corresponds is identical or different, and reference may be made to the embodiments of the first aspect for details.

In some embodiments, the above cell information is common for PLMN or specific for PLMN, that is, the network device may generate common cell information for each PLMN, or generate the above cell information respectively for each PLMN.

It can be seen from the above embodiments that the terminal equipment may determine whether the cell and/or the frequency of the cell is a candidate cell and/or a candidate frequency in the cell selection and/or cell reselection process of the reduced capability terminal equipment according to the existing cell information or improved cell information. Thus, during the cell selection and/or cell reselection process, by indicating that the cell supports or restricts the access of the reduced capability terminal equipment (RedCap UE) to a cell for the access state of the reduced capability terminal equipment, it may be helpful to avoid congestion caused by the access and connection of a large number of reduced capability terminal equipments, maintain network capabilities, and provide good services to other conventional terminal equipments.

Furthermore, when the reduced capability terminal equipment and non-reduced capability terminal equipment (such as a conventional capability terminal equipment) coexist in the network, the access of reduced capability terminal equipment and non-reduced capability terminal equipment may be distinguished, which is convenient for the network operator to restrict the access of the reduced capability terminal equipment (for example, the network operator may set a cell and/or frequency to be only providing services related to the terminal with conventional capabilities) or restrict the access of the conventional capability terminal equipment (for example, the network operator may set a cell and/or frequency to be only providing services specifically for the communication of the reduced capability terminal equipment (such as an industrial wireless sensor). In addition, the operations are simple and behaviors of existing conventional terminal equipments are not affected.

Embodiments of a Third Aspect

The embodiments of this disclosure provide a cell selection or reselection method, which shall be described from a side of a reduced capability terminal equipment.

Figure 6:
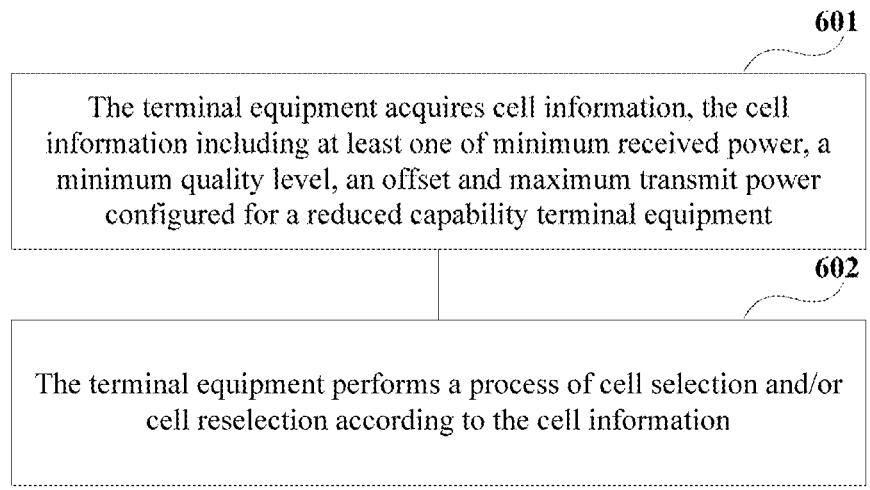
FIG. 6 is a schematic diagram of the cell selection or reselection method of an embodiment of this disclosure.

FIG. 6 is a schematic diagram of the cell selection or reselection method of the embodiment of this disclosure. As shown in FIG. 6, the method includes:
  601: the terminal equipment acquires cell information, the cell information including at least one of minimum received power, a minimum quality level, an offset and maximum transmit power configured for a reduced capability terminal equipment; and
  602: the terminal equipment performs a process of cell selection and/or cell reselection according to the cell information.

It should be noted that FIG. 6 only schematically illustrates the embodiments of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 6.

In some embodiments, the process of cell selection and/or reselection at least includes: calculating a parameter value representing cell quality, and determining according to the parameter value whether a first cell and/or a frequency of the first cell is a candidate cell and/or a candidate frequency in the process of cell selection and/or cell reselection of the reduced capability terminal equipment.

For example, the parameter value representing the cell quality may be calculated according to newly added cell information. For example, the cell information includes at least one of minimum received power, a minimum quality level, an offset and maximum transmit power configured for the reduced capability terminal equipment.

In the above embodiments, the terminal equipment may calculate the parameter value representing the cell quality according to the above cell information, and determine that the first cell and/or the frequency of the first cell is/are not a candidate cell and/or a candidate frequency when the parameter value does not satisfy a predetermined condition (S standard). Reference may be made to the embodiment of the first aspect for details, which shall not be repeated herein any further.

It can be seen from the above embodiments that by configuring specific parameters for the reduced capability terminal equipment (such as determining relevant parameters of a suitable cell), determination results of the cell selection and/or reselection (such as whether it is a suitable cell) of the reduced capability terminal equipment may be distinguished from determination results of the cell selection and/or reselection of the conventional capability terminal equipment, thereby achieving the goal of restricting access to the cell or normally camping on the cell by the reduced capability terminal equipment.

Embodiments of a Fourth Aspect

The embodiments of this disclosure provide a cell selection or reselection method, which shall be described from a side of a reduced capability terminal equipment.

Figure 7:
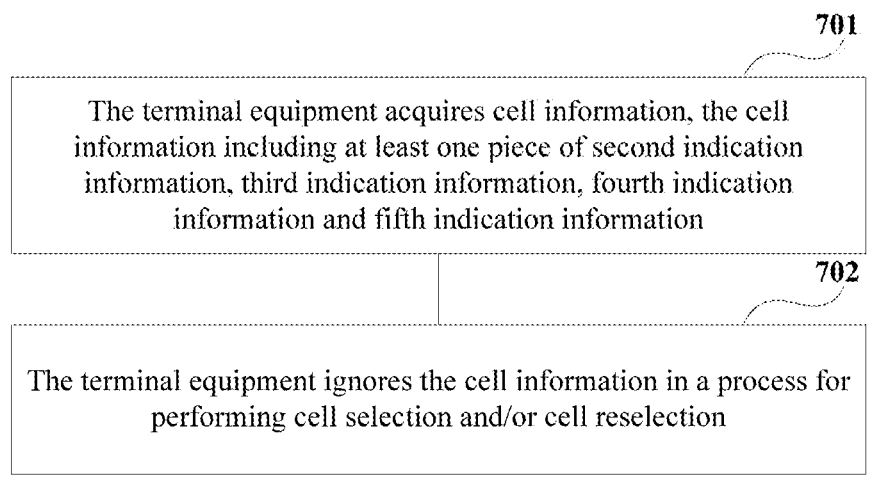
FIG. 7 is another schematic diagram of the cell selection or reselection method of the embodiment of this disclosure.

FIG. 7 is a schematic diagram of the cell selection or reselection method of the embodiment of this disclosure. As shown in FIG. 7, the method includes:

701: the terminal equipment acquires cell information, the cell information including at least one piece of second indication information, third indication information, fourth indication information and fifth indication information, the second indication information indicating whether a first cell and/or a frequency of the first cell is/are in a barred state, the third indication information indicating whether the first cell and/or the frequency of the first cell is/are reserved for use by an operator, the fourth indication information indicating whether the first cell and/or the frequency of the first cell is/are reserved for other use, and the fifth indication information indicating whether the first cell and/or the frequency of the first cell is/are reserved for use in the future; and 702: the terminal equipment ignores the cell information in a process for performing cell selection and/or cell reselection.

It should be noted that FIG. 7 only schematically illustrates the embodiments of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 7.

In some embodiments, reference may be made to the embodiments of the first aspect for implementations of the second indication information, the third indication information, the fourth indication information and the fifth indication information may, which shall not be repeated here any further.

In some embodiments, the RedCap UE does not consider (ignore) the above cell information in performing the process of cell selection and/or cell reselection. For example, when it is intended to restrict access of a non-RedCap UE and support access of the RedCap UE, the above cell information may be set to be in a barred or reserved state, i.e. for the non-RedCap UE, it is deemed that the cell and/or the frequency of the cell is/are not a candidate cell and/or a candidate frequency, that is, the access of the non-RedCap UE is restricted, while the RedCap UE ignores the above cell information, that is, no effect is imposed on the process of cell selection and/or reselection of the RedCap UE.

It can be seen from the above embodiments that when the reduced capability terminal equipment and non-reduced capability terminal equipment (such as a conventional capability terminal equipment) coexist in the network, the access of reduced capability terminal equipment and non-reduced capability terminal equipment may be distinguished, which is convenient for the network operator to restrict the access of the reduced capability terminal equipment (for example, the network operator may set a cell and/or frequency to be only providing services related to the terminal with conventional capabilities) or restrict the access of the conventional capability terminal equipment (for example, the network operator may set a cell and/or frequency to be only providing services specifically for the communication of the reduced capability terminal equipment (such as an industrial wireless sensor). In addition, the operations are simple and behaviors of existing conventional terminal equipments are not affected.

Embodiments of a Fifth Aspect

The embodiments of this disclosure provide a cell selection or reselection method, which shall be described from a second type of reduced capability terminal equipment.

Figure 8:
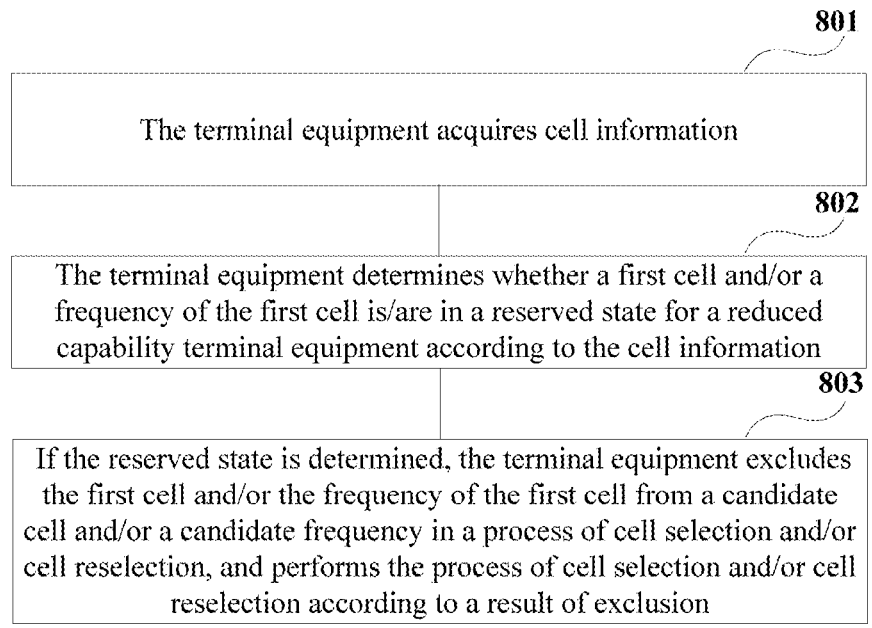
FIG. 8 is a further schematic diagram of the cell selection or reselection method of the embodiment of this disclosure.

FIG. 8 is a schematic diagram of the cell selection or reselection method of the embodiment of this disclosure. As shown in FIG. 8, the method includes:

801: the terminal equipment acquires cell information;

802: the terminal equipment determines whether a first cell and/or a frequency of the first cell is/are in a reserved state for a reduced capability terminal equipment according to the cell information;

803: if the reserved state is determined, the terminal equipment excludes the first cell and/or the frequency of the first cell from a candidate cell and/or a candidate frequency in a process of cell selection and/or cell reselection, and performs the process of cell selection and/or cell reselection according to a result of exclusion.

It should be noted that FIG. 8 only schematically illustrates the embodiments of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 8.

In some embodiments, the cell information may be the first indication information or related information described in the embodiment of the first aspect, and reference may be made to the embodiments of the first aspect for detailed operations of 801-802, which shall not be repeated herein any further.

In some embodiments, when it is determined that the first cell and/or the frequency of the first cell is in a reserved state for the reduced capability terminal equipment, the reduced capability terminal equipment will determine that the first cell and/or the frequency of the first cell is/are a candidate cell and/or a candidate frequency, while the second type of reduced capability terminal equipment excludes the first cell and/or the frequency of the first cell from candidate cells and/or candidate frequencies in the process of cell selection and/or cell reselection, and performs the process of cell selection and/or cell reselection according to a result of exclusion. Reference may be made to related technologies for details, which shall not be repeated herein any further.

It can be seen from the above embodiments that the non-reduced capability terminal equipment may determine whether the cell and/or the frequency of the cell allow(s) access according to the cell information. Therefore, the network operator may set the cell information to bar the access of the non-reduced capability terminal equipment, thereby setting a specific cell and/or frequency to be serving for relevant services of the reduced capability terminal equipment, and performing specific setting and optimization of network parameters according to the relevant services, which is helpful to better providing services for the reduced capability terminal equipment. For example, in an industrial or factory environment, a cell/some cell(s) and/or a frequency/some frequencies may be set to be a specific network for service communications of industrial wireless sensors.

Embodiments of a Sixth Aspect

The embodiments of this disclosure provide a cell selection or reselection apparatus. The apparatus may be, for example, a terminal equipment (such as a reduced capability terminal equipment), or may be one or more components or assemblies configured in a terminal equipment, with contents identical to those in the embodiments of the first aspect being not going to be described herein any further.

Figure 9:
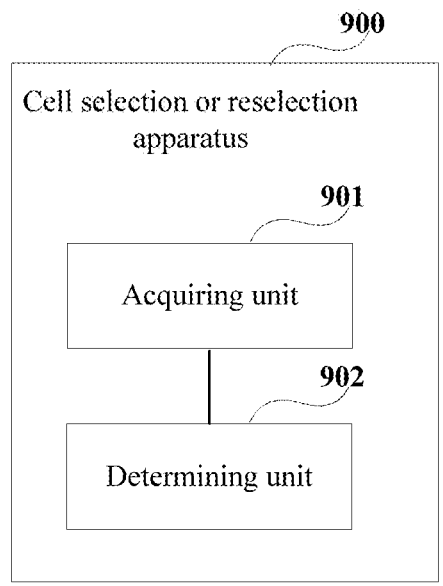
FIG. 9 is a schematic diagram of the cell selection or reselection apparatus of an embodiment of this disclosure.

FIG. 9 is a schematic diagram of the cell selection or reselection apparatus of the embodiment of this disclosure. As shown in FIG. 9, the cell selection or reselection apparatus 900 includes:
an acquiring unit 901 configured to acquire cell information; and
a determining unit 902 configured to determine whether a first cell and/or a frequency of the first cell is/are a candidate cell and/or a candidate frequency in a process of cell selection and/or cell reselection of a reduced capability terminal equipment.

In some embodiments, reference may be made to 301-302 in the embodiments of the first aspect for the acquiring unit 901 and the determining unit 902, which shall not be described herein any further.

In some embodiments, the cell information includes first indication information or does not include first indication information, the first indication information being used to indicate whether the first cell and/or the frequency of the first cell is/are in a barred state or a unreserved state for the reduced capability terminal equipment, or the first indication information being used to indicate whether the first cell and/or the frequency of the first cell is/are in a supported state or a reserved state for the reduced capability terminal equipment.

In some embodiments, the determining unit 902 includes:
a first determining module (not shown in figures) configured to determine that the first cell and/or the frequency of the first cell is/are not the candidate cell and/or the candidate frequency in the process of cell selection and/or cell reselection of the reduced capability terminal equipment when the cell information includes the first indication information and the first indication information indicates that the first cell and/or the frequency of the first cell is/are in a barred state or a unreserved state for the reduced capability terminal equipment;
and/or,
a second determining module (not shown in figures) configured to determine that the first cell and/or the frequency of the first cell is/are the candidate cell and/or the candidate frequency in the process of cell selection and/or cell reselection of the reduced capability terminal equipment when the cell information includes the first indication information and the first indication information indicates that the first cell and/or the frequency of the first cell is/are in an unbarred state or a supported state or a reserved state for the reduced capability terminal equipment.

In some embodiments, the determining unit 902 includes:
a third determining module (not shown in figures) configured to determine that the first cell and/or the frequency of the first cell is/are not the candidate cell and/or the candidate frequency in the process of cell selection and/or cell reselection of the reduced capability terminal equipment when the cell information includes the first indication information and the first indication information indicates that the first cell and/or the frequency of the first cell is/are in a barred state or a unreserved state for the reduced capability terminal equipment, and determine that the first cell and/or the frequency of the first cell is/are the candidate cell and/or the candidate frequency in the process of cell selection and/or cell reselection of the reduced capability terminal equipment when the cell information does not include the first indication information;
or,
a fourth determining module (not shown in figures) configured to determine that the first cell and/or the frequency of the first cell is/are the candidate cell and/or the candidate frequency in the process of cell selection and/or cell reselection of the reduced capability terminal equipment when the cell information includes the first indication information and the first indication information indicates that the first cell and/or the frequency of the first cell is/are in an unbarred state or a supported state or a reserved state for the reduced capability terminal equipment, and determine that the first cell and/or the frequency of the first cell is/are not the candidate cell and/or the candidate frequency in the process of cell selection and/or cell reselection of the reduced capability terminal equipment when the cell information does not include the first indication information.

In the above embodiments, the third determining module determines that the first cell and/or the frequency of the first cell is/are in an unbarred state for the reduced capability terminal equipment and the first cell and/or the frequency of the first cell is/are the candidate cell and/or the candidate frequency in the process of cell selection and/or cell reselection of the reduced capability terminal equipment when the cell information does not include the first indication information; or, the fourth determining module determines that the first cell and/or the frequency of the first cell is/are in a barred state or a unreserved state for the reduced capability terminal equipment and the first cell and/or the frequency of the first cell is/are not the candidate cell and/or the candidate frequency in the process of cell selection and/or cell reselection of the reduced capability terminal equipment when the cell information does not include the first indication information.

In some embodiments, the cell information includes or does not include relevant information of the reduced capability terminal equipment, the relevant information including at least one piece of access resource information of the reduced capability terminal equipment, system information related to the reduced capability terminal equipment, information indicating a relevant PLMN of the reduced capability terminal equipment, search space or control resource set information of the reduced capability terminal equipment, and bandwidth information of the reduced capability terminal equipment. The determining unit 902 includes:

a fifth determining module (not shown in figures) configured to determine that the first cell and/or the frequency of the first cell is/are the candidate cell and/or the candidate frequency in the process of cell selection and/or cell reselection of the reduced capability terminal equipment when the cell information includes the relevant information, and determine that the first cell and/or the frequency of the first cell is/are not the candidate cell and/or the candidate frequency in the process of cell selection and/or cell reselection of the reduced capability terminal equipment when the cell information does not include the relevant information.

In some embodiments, the cell information further includes at least one piece of second indication information, third indication information, fourth indication information and fifth indication information, the second indication information indicating whether a first cell and/or a frequency of the first cell is/are in a barred state, the third indication information indicating whether the first cell and/or the frequency of the first cell is/are reserved for use by an operator, the fourth indication information indicating whether the first cell and/or the frequency of the first cell is/are reserved for other use, and the fifth indication information indicating whether the first cell and/or the frequency of the first cell is/are reserved for use in the future In some embodiments, the determining unit 902 further includes:

a seventh determining module (not shown in figures) configured to determine whether the first cell and/or the frequency of the first cell is/are the candidate cell and/or the candidate frequency in the process of cell selection and/or cell reselection of the reduced capability terminal equipment according to at least one piece of the second indication information, third indication information, fourth indication information and fifth indication information.

In some embodiments, the determining unit 902 may further ignore the second indication information, third indication information, fourth indication information and fifth indication information.

In some embodiments, the determining unit 902 may determine that the first cell and/or the frequency of the first cell is/are a candidate cell and/or a candidate frequency in the process of cell selection and/or cell reselection of the reduced capability terminal equipment when the second indication information indicates that the first cell and/or the frequency of the first cell is/are not in a barred state and it is determined that the first cell and/or the frequency of the first cell is/are in a reserved state for the reduced capability terminal equipment.

In some embodiments, the cell information includes at least one of minimum received power, a minimum quality level, an offset and maximum transmit power configured for the reduced capability terminal equipment.

In some embodiments, the determining unit 902 further includes:

a calculating module (not shown in figures) configured to calculate a parameter value indicating cell quality according to the cell information; and a sixth determining module (not shown in figures) configured to determine that the first cell and/or the frequency of the first cell is/are not the candidate cell and/or the candidate frequency when the parameter value does not satisfy a predetermined condition.

In some embodiments, the above first determining module, second determining module, third (fourth) determining module, fifth determining module, sixth determining module and seventh determining module may be implemented separately or in a combined manner, and this embodiment is not limited thereto.

In some embodiments, the first cell is a second cell to which the cell information corresponds and/or a cell other than the second cell, and the frequency of the first cell is a first frequency of the second cell and/or a frequency (inter-frequency) other than the first frequency. The other cell includes at least one other cell, and the other frequency includes at least one other frequency.

In some embodiments, the cell information is carried by system information, or the cell information may further be included in a random access response (RAR) message or a radio resource control (RRC) reject message.

In some embodiments, the cell information corresponds to a type or use scenario of the reduced capability terminal equipment, that is, the cell information is configured respectively for each type or use scenario of reduced capability terminal equipment, wherein the cell information to which at least one type or use scenario of the reduced capability terminal equipment corresponds is identical or different; and/or, the cell information is common for PLMN or specific for PLMN.

In some embodiments, the apparatus further includes:

a searching unit (optional, not shown in figures) configured to search for at least two third cells of strongest signals, or determine a fourth cell with RSRP higher than a threshold, and the acquiring unit 901 acquires cell information transmitted by the third cell and/or the fourth cell.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the cell selection or reselection apparatus 900 may further include other components or modules, and reference may be made to related techniques for particulars of these components or modules.

Furthermore, for the sake of simplicity, connection relationships between the components or modules or signal profiles thereof are only illustrated in FIG. 9. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the terminal equipment may determine whether the cell and/or the frequency of the cell is a candidate cell and/or a candidate frequency in the cell selection and/or cell reselection process of the reduced capability terminal equipment according to the existing cell information or improved cell information. Thus, during the cell selection and/or cell reselection process, by indicating that the cell supports or restricts the access of the reduced capability terminal equipment (RedCap UE) to a cell for the access state of the reduced capability terminal equipment, it may be helpful to avoid congestion caused by the access and connection of a large number of reduced capability terminal equipments, maintain network capabilities, and provide good services to other conventional terminal equipments.

Furthermore, when the reduced capability terminal equipment and non-reduced capability terminal equipment (such as a conventional capability terminal equipment) coexist in the network, the access of reduced capability terminal equipment and non-reduced capability terminal equipment may be distinguished, which is convenient for the network operator to restrict the access of the reduced capability terminal equipment (for example, the network operator may set a cell and/or frequency to be only providing services related to the terminal with conventional capabilities) or restrict the access of the conventional capability terminal equipment (for example, the network operator may set a cell and/or frequency to be only providing services specifically for the communication of the reduced capability terminal equipment (such as an industrial wireless sensor). In addition, the operations are simple and behaviors of existing conventional terminal equipments are not affected.

Embodiments of a Seventh Aspect

The embodiments of this disclosure provide a cell selection or reselection apparatus. The apparatus may be, for example, a terminal equipment, or may be one or more components or assemblies configured in a terminal equipment, with contents identical to those in the embodiment of the third aspect being not going to be described herein any further.

Figure 10:
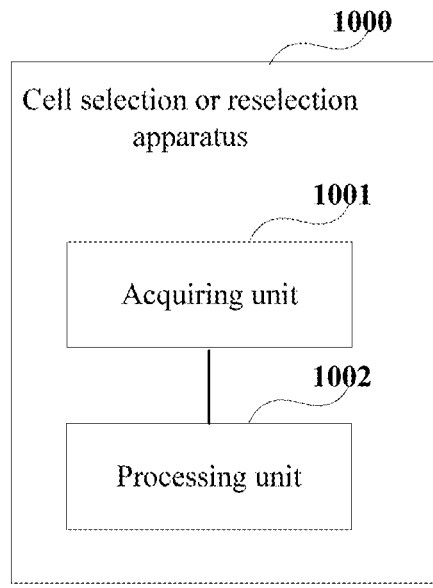
FIG. 10 is another schematic diagram of the cell selection or reselection apparatus of the embodiment of this disclosure.

FIG. 10 is a schematic diagram of the cell selection or reselection apparatus of the embodiment of this disclosure. As shown in FIG. 10, the cell selection or reselection apparatus 1000 includes:

an acquiring unit 1001 configured to acquire cell information, the cell information including at least one of minimum received power, a minimum quality level, an offset and maximum transmit power configured for a reduced capability terminal equipment; and a processing unit 1001 configured to perform a process of cell selection and/or cell reselection according to the cell information.

In some embodiments, reference may be made to 601-602 in the embodiments of the third aspect for the acquiring unit 1001 and the processing unit 1002, which shall not be repeated herein any further.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the cell selection or reselection apparatus 1000 may further include other components or modules, and reference may be made to related techniques for particulars of these components or modules.

Furthermore, for the sake of simplicity, connection relationships between the components or modules or signal profiles thereof are only illustrated in FIG. 10. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that by configuring specific parameters for the reduced capability terminal equipment (such as determining relevant parameters of a suitable cell), determination results of the cell selection and/or reselection (such as whether it is a suitable cell) of the reduced capability terminal equipment may be distinguished from determination results of the cell selection and/or reselection of the conventional capability terminal equipment, thereby achieving the goal of restricting access to the cell or normally camping on the cell by the reduced capability terminal equipment.

Embodiments of an Eighth Aspect

The embodiments of this disclosure provide a cell selection or reselection apparatus. The apparatus may be, for example, a terminal equipment, or may be one or more components or assemblies configured in a terminal equipment, with contents identical to those in the embodiments of the fourth aspect being not going to be described herein any further.

Figure 11:
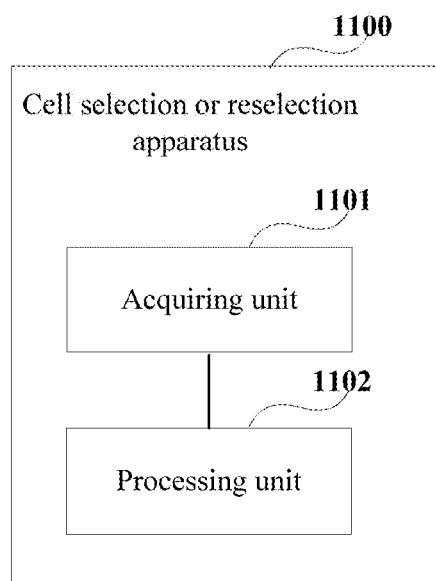
FIG. 11 is a further schematic diagram of the cell selection or reselection apparatus of the embodiment of this disclosure.

FIG. 11 is a schematic diagram of the cell selection or reselection apparatus of the embodiment of this disclosure. As shown in FIG. 11, the cell selection or reselection apparatus 1100 includes:

an acquiring unit 1101 configured to acquire cell information, the cell information including at least one piece of second indication information, third indication information, fourth indication information and fifth indication information, the second indication information indicating whether a first cell and/or a frequency of the first cell is/are in a barred state, the third indication information indicating whether the first cell and/or the frequency of the first cell is/are reserved for use by an operator, the fourth indication information indicating whether the first cell and/or the frequency of the first cell is/are reserved for other use, and the fifth indication information indicating whether the first cell and/or the frequency of the first cell is/are reserved for use in the future; and a processing unit 1102 configured to ignore the cell information in a process for performing cell selection and/or cell reselection.

In some embodiments, reference may be made to 701-702 in the embodiments of the fourth aspect for the acquiring unit 1101 and the processing unit 1102, which shall not be repeated herein any further.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the cell selection or reselection apparatus 1100 may further include other components or modules, and reference may be made to related techniques for particulars of these components or modules.

Furthermore, for the sake of simplicity, connection relationships between the components or modules or signal profiles thereof are only illustrated in FIG. 11. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that when the reduced capability terminal equipment and non-reduced capability terminal equipment (such as a conventional capability terminal equipment) coexist in the network, the access of reduced capability terminal equipment and non-reduced capability terminal equipment may be distinguished, which is convenient for the network operator to restrict the access of the reduced capability terminal equipment (for example, the network operator may set a cell and/or frequency to be only providing services related to the terminal with conventional capabilities) or restrict the access of the conventional capability terminal equipment (for example, the network operator may set a cell and/or frequency to be only providing services specifically for the communication of the reduced capability terminal equipment (such as an industrial wireless sensor). In addition, the operations are simple and behaviors of existing conventional terminal equipments are not affected.

Embodiments of a Ninth Aspect

The embodiments of this disclosure provide a cell selection or reselection apparatus. The apparatus may be, for example, a terminal equipment, or may be one or more components or assemblies configured in a terminal equipment, with contents identical to those in the embodiments of the fifth aspect being not going to be described herein any further.

Figure 12:
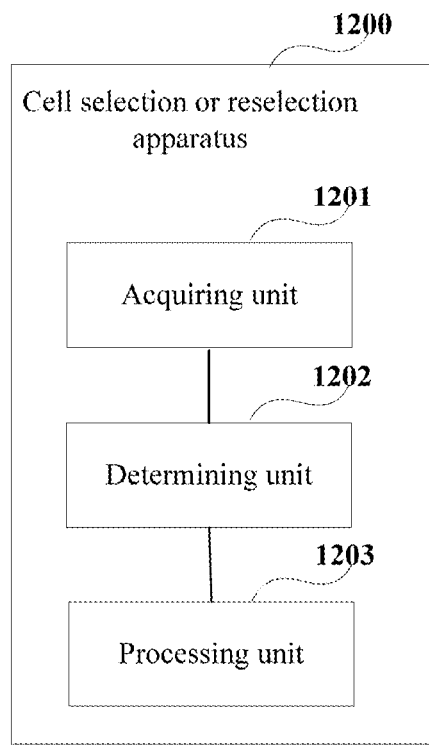
FIG. 12 is still another schematic diagram of the cell selection or reselection apparatus of the embodiment of this disclosure.

FIG. 12 is a schematic diagram of the cell selection or reselection apparatus of the embodiment of this disclosure. As shown in FIG. 12, the cell selection or reselection apparatus 1200 includes:

an acquiring unit 1201 configured to acquire cell information;

a determining unit 1202 configured to determine whether a first cell and/or a frequency of the first cell is/are in a reserved state for a reduced capability terminal equipment according to the cell information; and a processing unit 1203 configured to, if the reserved state is determined by the determining unit 1202, exclude the first cell and/or the frequency of the first cell from a candidate cell and/or a candidate frequency in a process of cell selection and/or cell reselection by the terminal equipment, and perform the process of cell selection and/or cell reselection according to a result of exclusion.

In some embodiments, reference may be made to 400-401 in the embodiment of the fifth aspect for the acquiring unit 1201, the determining unit 1202 and the processing unit 1203, which shall not be repeated herein any further.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the cell selection or reselection apparatus 1200 may further include other components or modules, and reference may be made to related techniques for particulars of these components or modules.

Furthermore, for the sake of simplicity, connection relationships between the components or modules or signal profiles thereof are only illustrated in FIG. 12. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the non-reduced capability terminal equipment may determine whether the cell and/or the frequency of the cell allow(s) access according to the cell information. Therefore, the network operator may set the cell information to bar the access of the non-reduced capability terminal equipment, thereby setting a specific cell and/or frequency to be serving for relevant services of the reduced capability terminal equipment, and performing specific setting and optimization of network parameters according to the relevant services, which is helpful to better providing services for the reduced capability terminal equipment. For example, in an industrial or factory environment, a cell/some cell(s) and/or a frequency/some frequencies may be set to be a specific network for service communications of industrial wireless sensors.

Embodiments of a Tenth Aspect

The embodiments of this disclosure provide an information transmission apparatus. The apparatus may be, for example, a network device, or may be one or more components or assemblies configured in a network device, with contents identical to those in the embodiments of the second aspect being not going to be described herein any further.

Figure 13:
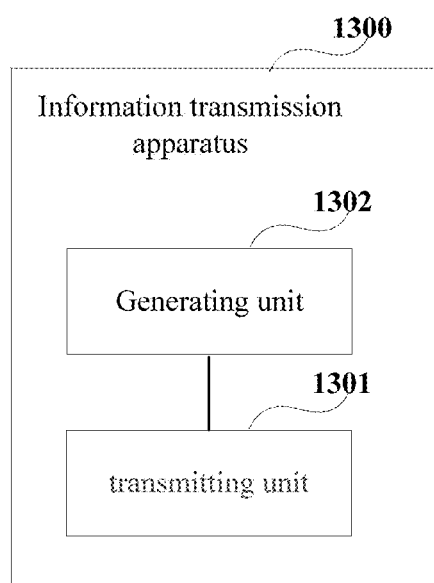
FIG. 13 is a schematic diagram of the information transmission apparatus of an embodiment of this disclosure.

FIG. 13 is a schematic diagram of the information transmission apparatus of the embodiment of this disclosure. As shown in FIG. 13, the cell selection or reselection apparatus 1300 includes:

a transmitting unit 1301 configured to transmit cell information, the cell information being used by a terminal equipment to determine whether a first cell and/or a frequency of the first cell is/are a candidate cell and/or a candidate frequency in a process of cell selection and/or cell reselection of a reduced capability terminal equipment.

In some embodiments, the transmitting unit 1301 carries the cell information via system information, or may also carry the cell information via a random access response message or an RRC reject message. Reference may be made to the embodiment of the first aspect for implementation of the cell information, which shall not be repeated herein any further.

In some embodiments, the apparatus may further include (optional):

a generating unit 1302 configured to generate the cell information.

In some embodiments, reference may be made to 500-501 in the embodiments of the second aspect for the transmitting unit 1301 and the generating unit 1302, which shall not be repeated herein any further.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the information transmission apparatus 1300 may further include other components or modules, and reference may be made to related techniques for particulars of these components or modules. Furthermore, for the sake of simplicity, connection relationships between the components or modules or signal profiles thereof are only illustrated in FIG. 13. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the terminal equipment may determine whether the cell and/or the frequency of the cell is a candidate cell and/or a candidate frequency in the cell selection and/or cell reselection process of the reduced capability terminal equipment according to the existing cell information or improved cell information. Thus, during the cell selection and/or cell reselection process, by indicating that the cell supports or restricts the access of the reduced capability terminal equipment (RedCap UE) to a cell for the access state of the reduced capability terminal equipment, it may be helpful to avoid congestion caused by the access and connection of a large number of reduced capability terminal equipments, maintain network capabilities, and provide good services to other conventional terminal equipments.

Furthermore, when the reduced capability terminal equipment and non-reduced capability terminal equipment (such as a conventional capability terminal equipment) coexist in the network, the access of reduced capability terminal equipment and non-reduced capability terminal equipment may be distinguished, which is convenient for the network operator to restrict the access of the reduced capability terminal equipment (for example, the network operator may set a cell and/or frequency to be only providing services related to the terminal with conventional capabilities) or restrict the access of the conventional capability terminal equipment (for example, the network operator may set a cell and/or frequency to be only providing services specifically for the communication of the reduced capability terminal equipment (such as an industrial wireless sensor). In addition, the operations are simple and behaviors of existing conventional terminal equipments are not affected.

Embodiments of an Eleventh Aspect

The embodiments of this disclosure provide a communication system, and reference may be made to FIG. 1, with contents identical to those in the embodiments of the first to the tenth aspects being not going to be described herein any further.

In some embodiments, the communication system 100 may at least include a terminal equipment 102 and a network device 101.

In some embodiments, the network device 101 transmits cell information, and the terminal equipment 102 acquires the cell information, and determines according to the cell information whether a first cell and/or a frequency of the first cell is/are a candidate cell and/or a candidate frequency in a process of cell selection and/or cell reselection of a reduced capability terminal equipment.

In some embodiments, the network device 101 transmits the cell information, and the terminal equipment 102 acquires the cell information, the cell information including at least one of minimum received power, a minimum quality level, an offset and maximum transmit power configured for the reduced capability terminal equipment, and performs the process of cell selection and/or cell reselection according to the cell information.

In some embodiments, the network device 101 transmits the cell information, and the terminal equipment 102 acquires the cell information, the cell information including at least one piece of second indication information, third indication information, fourth indication information and fifth indication information, the second indication information indicating whether a first cell and/or a frequency of the first cell is/are in a barred state, the third indication information indicating whether the first cell and/or the frequency of the first cell is/are reserved for use by an operator, the fourth indication information indicating whether the first cell and/or the frequency of the first cell is/are reserved for other use, and the fifth indication information indicating whether the first cell and/or the frequency of the first cell is/are reserved for use in the future, and ignores the cell information to perform the process for performing cell selection and/or cell reselection.

In some embodiments, the network device 101 transmits the cell information, the terminal equipment 102 acquires the cell information, and determines according to the cell information whether a first cell and/or a frequency of the first cell is/are in a reserved state for a reduced capability terminal equipment. If the reserved state is determined, the terminal equipment 102 excludes the first cell and/or the frequency of the first cell from a candidate cell and/or a candidate frequency in a process of cell selection and/or cell reselection by the terminal equipment, and performs the process of cell selection and/or cell reselection according to a result of exclusion.

The embodiments of this disclosure further provide a network device, which may be, for example, a base station. However, this disclosure is not limited thereto, and it may also be another network device.

Figure 14:
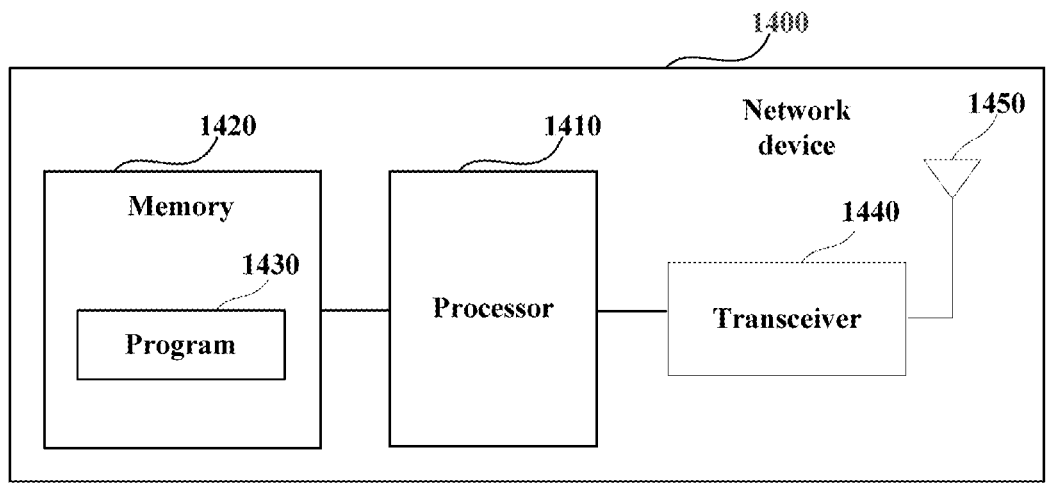
FIG. 14 is a schematic diagram of the network device of an embodiment of this disclosure.

FIG. 14 is a schematic diagram of a structure of the network device of the embodiment of this disclosure. As shown in FIG. 14, the network device 1400 may include a processor 1410 (such as a central processing unit (CPU))

and a memory 1420, the memory 1420 being coupled to the processor 1410. Wherein, the memory 1420 may store various data, and furthermore, it may store a program 1430 for information processing, and execute the program 1430 under control of the processor 1410.

For example, the processor 1410 may be configured to execute a program to carry out the information transmission method as described in the embodiments of the second aspect. For example, the processor 1410 may be configured to execute the following control: transmitting cell information, the cell information being used by a terminal equipment to determine whether a first cell and/or a frequency of the first cell is/are a candidate cell and/or a candidate frequency in a process of cell selection and/or cell reselection of a reduced capability terminal equipment.

Furthermore, as shown in FIG. 14, the network device 1400 may include a transceiver 1440, and an antenna 1450, etc. Functions of the above components are similar to those in the prior art, and shall not be described herein any further. It should be noted that the network device 1400 does not necessarily include all the parts shown in FIG. 14, and furthermore, the network device 1400 may include parts not shown in FIG. 14, and the prior art may be referred to.

The embodiments of this disclosure further provide a terminal equipment; however, this disclosure is not limited thereto, and it may also be another equipment.

Figure 15:
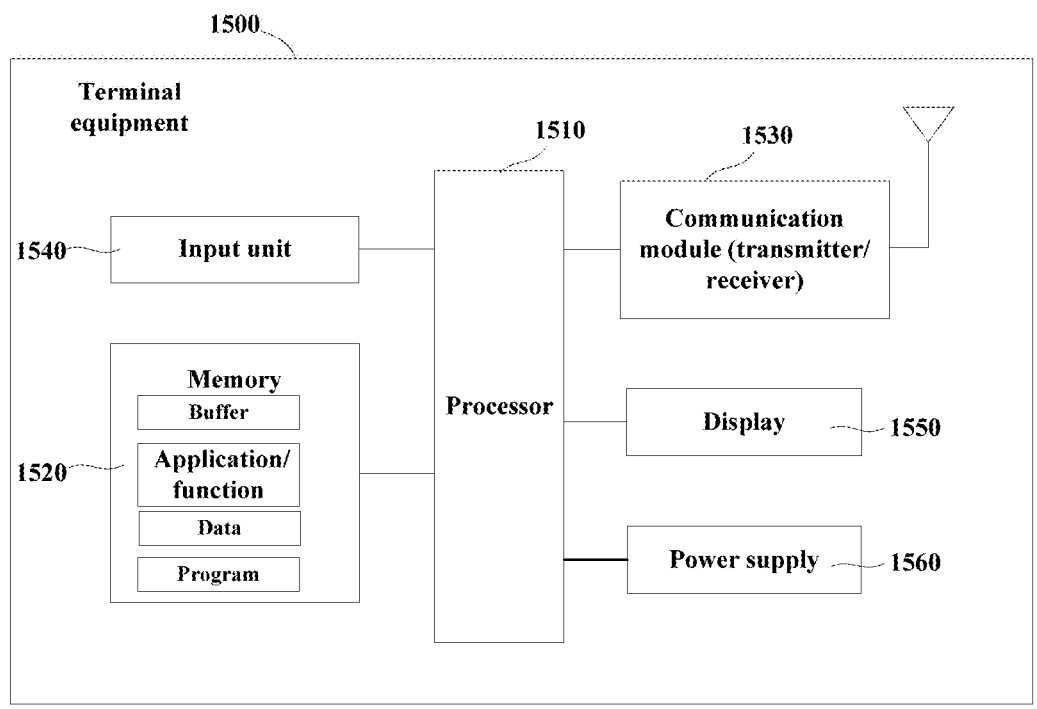
FIG. 15 is a schematic diagram of the terminal equipment of an embodiment of this disclosure.

FIG. 15 is a schematic diagram of the terminal equipment of the embodiment of this disclosure. As shown in FIG. 15, the terminal equipment 1500 may include a processor 1510 and a memory 1520, the memory 1520 storing data and a program and being coupled to the processor 1510. It should be noted that this figure is illustrative only, and other types of structures may also be used, so as to supplement or replace this structure and achieve a telecommunications function or other functions.

For example, the processor 1510 may be configured to execute a program to carry out the cell selection or reselection method as described in the embodiments of the first and the third to fifth aspects. For example, the processor 1510 may be configured to perform the following control: acquiring cell information; and determining whether a first cell and/or a frequency of the first cell is/are a candidate cell and/or a candidate frequency in a process of cell selection and/or cell reselection of a reduced capability terminal equipment.

For example, the processor 1510 may be configured to perform the following control: acquiring cell information, the cell information including at least one piece of second indication information, third indication information, fourth indication information and fifth indication information, the second indication information indicating whether a first cell and/or a frequency of the first cell is/are in a barred state, the third indication information indicating whether the first cell and/or the frequency of the first cell is/are reserved for use by an operator, the fourth indication information indicating whether the first cell and/or the frequency of the first cell is/are reserved for other use, and the fifth indication information indicating whether the first cell and/or the frequency of the first cell is/are reserved for use in the future; and ignoring the cell information in to perform a process for performing cell selection and/or cell reselection.

For example, the processor 1510 may be configured to perform the following control: acquiring cell information by the terminal equipment; determining according to the cell information whether a first cell and/or a frequency of the first cell is/are in a reserved state for a reduced capability terminal equipment; if the reserved state is determined, excluding the first cell and/or the frequency of the first cell from a candidate cell and/or a candidate frequency in a process of cell selection and/or cell reselection, and performing the process of cell selection and/or cell reselection according to a result of exclusion.

For example, the processor 1510 may be configured to perform the following control: acquiring cell information, the cell information including at least one of minimum received power, a minimum quality level, an offset and maximum transmit power configured for a reduced capability terminal equipment; and performing a process of cell selection and/or cell reselection according to the cell information.

As shown in FIG. 15, the terminal equipment 1500 may further include a communication module 1530, an input unit 1540, a display 1550, and a power supply 1560; wherein functions of the above components are similar to those in the prior art, which shall not be described herein any further. It should be noted that the terminal equipment 1500 does not necessarily include all the parts shown in FIG. 15, and the above components are not necessary. Furthermore, the terminal equipment 1500 may include parts not shown in FIG. 15, and the prior art may be referred to.

An embodiment of this disclosure provides a computer program, which, when executed in a terminal equipment, will cause the terminal equipment to carry out the cell selection or reselection method as described in the embodiments of the first and the third to fifth aspects.

An embodiment of this disclosure provides a storage medium, including a computer program, which will cause a terminal equipment to carry out the cell selection or reselection method as described in the embodiments of the first and the third to fifth aspects.

An embodiment of this disclosure provides a computer program, which, when executed in a network device, will cause the network device to carry out the information transmission method as described in the embodiments of the second aspect.

An embodiment of this disclosure provides a storage medium, including a computer program, which will cause a network device to carry out the information transmission method as described in the embodiments of the second aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

As to implementations containing the above embodiments, following supplements are further disclosed.

1. A cell selection or reselection method, applicable to a terminal equipment, the method including:
   acquiring cell information by the terminal equipment; and
   determining by the terminal equipment whether a first cell and/or a frequency of the first cell is/are a candidate cell and/or a candidate frequency in a process of cell selection and/or cell reselection of a reduced capability terminal equipment.
2. The method according to supplement 1, wherein the cell information includes first indication information or does not include first indication information, the first indication information being used to indicate whether the first cell and/or the frequency of the first cell is/are in a barred state or a unreserved state for the reduced capability terminal equipment, or the first indication information being used to indicate whether the first cell and/or the frequency of the first cell is/are in a supported state or a reserved state for the reduced capability terminal equipment.
3. The method according to supplement 2, wherein the determining by the terminal equipment whether a first cell and/or a frequency of the first cell is/are a candidate cell and/or a candidate frequency in a process of cell selection and/or cell reselection of a reduced capability terminal equipment includes:
   determining that the first cell and/or the frequency of the first cell is/are not the candidate cell and/or the candidate frequency in the process of cell selection and/or cell reselection of the reduced capability terminal equipment when the cell information includes the first indication information and the first indication information indicates that the first cell and/or the frequency of the first cell is/are in a barred state or a unreserved state for the reduced capability terminal equipment;
   and/or,
   determining that the first cell and/or the frequency of the first cell is/are the candidate cell and/or the candidate frequency in the process of cell selection and/or cell reselection of the reduced capability terminal equipment when the cell information includes the first indication information and the first indication information indicates that the first cell and/or the frequency of the first cell is/are in an unbarred state or a supported state or a reserved state for the reduced capability terminal equipment.
4. The method according to supplement 2, wherein the determining by the terminal equipment whether a first cell and/or a frequency of the first cell is/are a candidate cell and/or a candidate frequency in a process of cell selection and/or cell reselection of a reduced capability terminal equipment includes:
   determining that the first cell and/or the frequency of the first cell is/are not the candidate cell and/or the candidate frequency in the process of cell selection and/or cell reselection of the reduced capability terminal equipment when the cell information includes the first indication information and the first indication information indicates that the first cell and/or the frequency of the first cell is/are in a barred state or a unreserved state for the reduced capability terminal equipment, and determine that the first cell and/or the frequency of the first cell is/are the candidate cell and/or the candidate frequency in the process of cell selection and/or cell reselection of the reduced capability terminal equipment when the cell information does not include the first indication information;
   or,
   determining that the first cell and/or the frequency of the first cell is/are the candidate cell and/or the candidate frequency in the process of cell selection and/or cell reselection of the reduced capability terminal equipment when the cell information includes the first indication information and the first indication information indicates that the first cell and/or the frequency of the first cell is/are in an unbarred state or a supported state or a reserved state for the reduced capability terminal equipment, and determine that the first cell and/or the frequency of the first cell is/are not the candidate cell and/or the candidate frequency in the process of cell selection and/or cell reselection of the reduced capability terminal equipment when the cell information does not include the first indication information.
5. The method according to supplement 4, wherein when the cell information does not include the first indication information, the determining that the first cell and/or the frequency of the first cell is/are the candidate cell and/or the candidate frequency in the process of cell selection and/or cell reselection of the reduced capability terminal equipment includes:
   determining that the first cell and/or the frequency of the first cell is/are in an unbarred state for the reduced capability terminal equipment and the first cell and/or the frequency of the first cell is/are the candidate cell and/or the candidate frequency in the process of cell selection and/or cell reselection of the reduced capability terminal equipment.
6. The method according to supplement 4, wherein when the cell information does not include the first indication information, the determining that the first cell and/or the frequency of the first cell is/are not the candidate cell and/or the candidate frequency in the process of cell selection and/or cell reselection of the reduced capability terminal equipment includes:
when the cell information does not include the first indication information, determining that the first cell and/or the frequency of the first cell is/are in a barred state or a unreserved state for the reduced capability terminal equipment and the first cell and/or the frequency of the first cell is/are not the candidate cell and/or the candidate frequency in the process of cell selection and/or cell reselection of the reduced capability terminal equipment.
7. The method according to supplement 1, wherein the cell information includes or does not include relevant information of the reduced capability terminal equipment, and the determining by the terminal equipment whether a first cell and/or a frequency of the first cell is/are a candidate cell and/or a candidate frequency in a process of cell selection and/or cell reselection of a reduced capability terminal equipment includes:
determining that the first cell and/or the frequency of the first cell is/are the candidate cell and/or the candidate frequency in the process of cell selection and/or cell reselection of the reduced capability terminal equipment when the cell information includes the relevant information, and determining that the first cell and/or the frequency of the first cell is/are not the candidate cell and/or the candidate frequency in the process of cell selection and/or cell reselection of the reduced capability terminal equipment when the cell information does not include the relevant information.
8. The method according to supplement 7, wherein the relevant information includes at least one piece of access resource information of the reduced capability terminal equipment, system information related to the reduced capability terminal equipment, information indicating relevant PLMN of the reduced capability terminal equipment, search space information or control resource set information of the reduced capability terminal equipment, and bandwidth information of the reduced capability terminal equipment.
9. The method according to any one of supplements 1-8, wherein the first cell is a second cell to which the cell information corresponds and/or a cell other than the second cell, and the frequency of the first cell is a first frequency of the second cell and/or a frequency other than the first frequency.
10. The method according to supplement 9, wherein the other cell includes at least one other cell, and the other frequency includes at least one other frequency.
11. The method according to any one of supplements 1-10, wherein the cell information further includes at least one piece of second indication information, third indication information, fourth indication information and fifth indication information, the second indication information indicating whether the first cell and/or the frequency of the first cell is/are in a barred state;
the third indication information indicating whether the first cell and/or the frequency of the first cell is/are reserved for use by an operator;
the fourth indication information indicating whether the first cell and/or the frequency of the first cell is/are reserved for other use;
and the fifth indication information indicating whether the first cell and/or the frequency of the first cell is/are reserved for use in the future.
12. The method according to any one of supplements 1-11, wherein the terminal equipment is the reduced capability terminal equipment.
13. The method according to supplement 3 or 4, wherein when the second indication information indicates that the first cell and/or the frequency of the first cell is/are not in a barred state and it is determined that the first cell and/or the frequency of the first cell is/are in a reserved state for the reduced capability terminal equipment, the reduced capability terminal equipment determines that the first cell and/or the frequency of the first cell is/are the candidate cell and/or the candidate frequency in the process of cell selection and/or cell reselection of the reduced capability terminal equipment.
14. The method according to supplement 1, wherein the cell information includes at least one of minimum received power, a minimum quality level, an offset and maximum transmit power configured for the reduced capability terminal equipment.
15. The method according to supplement 13, wherein the performing the process of cell selection and/or cell reselection by the terminal equipment according to the cell information further includes:
calculating a parameter value indicating cell quality according to the cell information, and determining that the first cell and/or the frequency of the first cell is/are not the candidate cell and/or the candidate frequency when the parameter value does not satisfy a predetermined condition.
16. The method according to supplement 11, wherein the determining by the terminal equipment whether a first cell and/or a frequency of the first cell is/are a candidate cell and/or a candidate frequency in a process of cell selection and/or cell reselection of a reduced capability terminal equipment includes:
determining whether the first cell and/or the frequency of the first cell is/are the candidate cell and/or the candidate frequency in the process of cell selection and/or cell reselection of the reduced capability terminal equipment according to at least one piece of the second indication information, third indication information, fourth indication information and fifth indication information.
17. The method according to supplement 11, wherein the reduced capability terminal equipment ignores the second indication information, third indication information, fourth indication information and fifth indication information.
18. The method according to supplement 1, wherein the cell information is carried by system information or a random access response message or a radio resource control reject message.
19. The method according to any one of supplements 1-18, wherein the cell information corresponds to a type or use scenario of the reduced capability terminal equipment.
20. The method according to supplement 19, wherein cell information to which at least one type or use scenario of the reduced capability terminal equipment corresponds is identical or different.

21. The method according to any one of supplements 1-18, wherein the cell information is common for PLMN or specific for PLMN.

22. The method according to any one of supplements 1-21, wherein the method further includes:
searching for at least two third cells of strongest signals, or determining a fourth cell with RSRP higher than a threshold, by the terminal equipment,
and acquiring cell information transmitted by the third cell and/or the fourth cell by the terminal equipment.

23. An information transmission method, applicable to a network device, the method including:
generating cell information by the network device, the cell information being used by a terminal equipment to determine whether a first cell and/or a frequency of the first cell is/are a candidate cell and/or a candidate frequency in a process of cell selection and/or cell reselection of a reduced capability terminal equipment; and
transmitting the cell information by the network device.

24. The method according to supplement 23, wherein the cell information includes first indication information or does not include first indication information, the first indication information being used to indicate whether the first cell and/or the frequency of the first cell is/are in a barred state or a unreserved state for the reduced capability terminal equipment, or the first indication information being used to indicate whether the first cell and/or the frequency of the first cell is/are in a unbarred state or supported state or a reserved state for the reduced capability terminal equipment.

25. The method according to supplement 23, wherein the cell information includes or does not include relevant information of the reduced capability terminal equipment, the relevant information including at least one piece of access resource information of the reduced capability terminal equipment, system information related to the reduced capability terminal equipment, information indicating a relevant PLMN of the reduced capability terminal equipment, search space or control resource set information of the reduced capability terminal equipment, and/or the cell information includes at least one of minimum received power, a minimum quality level, an offset and maximum transmit power configured for the reduced capability terminal equipment.

26. The method according to any one of supplements 23-25, wherein the first cell is a second cell to which the cell information corresponds and/or a cell other than the second cell, and the frequency of the first cell is a first frequency of the second cell and/or a frequency other than the first frequency.

27. The method according to supplement 26, wherein the other cell includes at least one other cell, and the other frequency includes at least one other frequency.

28. The method according to any one of supplements 23-27, wherein the cell information is carried by system information or a random access response message or a radio resource control reject message.

29. The method according to any one of supplements 23-27, wherein the network device generates the information corresponding to the type or use scenario of the reduced capability terminal equipment according to the type or use scenario of the reduced capability terminal equipment.

30. The method according to supplement 29, wherein cell information to which at least one type or use scenario of the reduced capability terminal equipment corresponds is identical or different.

31. The method according to any one of supplements 23-27, wherein the cell information is common for PLMN common or specific for PLMN.

32. An information transmission method, applicable to a network device, the method including: transmitting cell information by the network device, the cell information being used to determine whether a first cell and/or a frequency of the first cell is/are a candidate cell and/or a candidate frequency in a process of cell selection and/or cell reselection of a reduced capability terminal equipment.

33. A cell selection or reselection method, applicable to a reduced capability terminal equipment, the method including:
acquiring cell information by the terminal equipment, the cell information including at least one piece of second indication information, third indication information, fourth indication information and fifth indication information, the second indication information indicating whether a first cell and/or a frequency of the first cell is/are in a barred state;
indicating by the third indication information whether the first cell and/or the frequency of the first cell is/are reserved for use by an operator;
indicating by the fourth indication information whether the first cell and/or the frequency of the first cell is/are reserved for other use;
indicating by the fifth indication information whether the first cell and/or the frequency of the first cell is/are reserved for use in the future; and
ignoring, by the terminal equipment, the cell information in a process for performing cell selection and/or cell reselection.

34. A cell selection or reselection method, applicable to a non-reduced capability terminal equipment of a first type, the method including:
acquiring cell information by the terminal equipment;
determining by the terminal equipment according to the cell information whether a first cell and/or a frequency of the first cell is/are in a reserved state for a reduced capability terminal equipment;
if the reserved state is determined, excluding the first cell and/or the frequency of the first cell from a candidate cell and/or a candidate frequency in a process of cell selection and/or cell reselection by the terminal equipment; and
performing the process of cell selection and/or cell reselection according to a result of exclusion.

35. A cell selection or reselection method, applicable to a terminal equipment, the method including:
acquiring cell information by the terminal equipment, the cell information including at least one of minimum received power, a minimum quality level, an offset and maximum transmit power configured for a reduced capability terminal equipment; and
performing a process of cell selection and/or cell reselection by the terminal equipment according to the cell information.

36. A terminal equipment, including a memory and a processor, the memory storing a computer program, and the processor being configured to execute the computer program to carry out the cell selection or reselection method as described in any one of supplements 1-22 and 33-35.

37. A network device, including a memory and a processor, the memory storing a computer program, and the processor being configured to execute the computer program to carry out the information transmission method as described in any one of supplements 23-31.
38. A cell selection or reselection apparatus, applicable to a terminal equipment, the apparatus including:
an acquiring unit configured to acquire cell information; and
a determining unit configured to determine whether a first cell and/or a frequency of the first cell is/are a candidate cell and/or a candidate frequency in a process of cell selection and/or cell reselection of a reduced capability terminal equipment.
39. The apparatus according to supplement 38, wherein the cell information includes first indication information or does not include first indication information, the first indication information being used to indicate whether the first cell and/or the frequency of the first cell is/are in a barred state or a unreserved state for the reduced capability terminal equipment, or the first indication information being used to indicate whether the first cell and/or the frequency of the first cell is/are in a supported state or a reserved state for the reduced capability terminal equipment.
40. The apparatus according to supplement 39, wherein the determining unit includes:
a first determining module configured to determine that the first cell and/or the frequency of the first cell is/are not the candidate cell and/or the candidate frequency in the process of cell selection and/or cell reselection of the reduced capability terminal equipment when the cell information includes the first indication information and the first indication information indicates that the first cell and/or the frequency of the first cell is/are in a barred state or a unreserved state for the reduced capability terminal equipment;
and/or,
a second determining module configured to determine that the first cell and/or the frequency of the first cell is/are the candidate cell and/or the candidate frequency in the process of cell selection and/or cell reselection of the reduced capability terminal equipment when the cell information includes the first indication information and the first indication information indicates that the first cell and/or the frequency of the first cell is/are in an unbarred state or a supported state or a reserved state for the reduced capability terminal equipment.
41. The apparatus according to supplement 39, wherein the determining unit includes:
a third determining module configured to determine that the first cell and/or the frequency of the first cell is/are not the candidate cell and/or the candidate frequency in the process of cell selection and/or cell reselection of the reduced capability terminal equipment when the cell information includes the first indication information and the first indication information indicates that the first cell and/or the frequency of the first cell is/are in a barred state or a unreserved state for the reduced capability terminal equipment, and determine that the first cell and/or the frequency of the first cell is/are the candidate cell and/or the candidate frequency in the process of cell selection and/or cell reselection of the reduced capability terminal equipment when the cell information does not include the first indication information;
or,
a fourth determining module configured to determine that the first cell and/or the frequency of the first cell is/are the candidate cell and/or the candidate frequency in the process of cell selection and/or cell reselection of the reduced capability terminal equipment when the cell information includes the first indication information and the first indication information indicates that the first cell and/or the frequency of the first cell is/are in an unbarred state or a supported state or a reserved state for the reduced capability terminal equipment, and determine that the first cell and/or the frequency of the first cell is/are not the candidate cell and/or the candidate frequency in the process of cell selection and/or cell reselection of the reduced capability terminal equipment when the cell information does not include the first indication information.
42. The apparatus according to supplement 41, wherein when the cell information does not include the first indication information, the third determining module determines that the first cell and/or the frequency of the first cell is/are in an unbarred state for the reduced capability terminal equipment and the first cell and/or the frequency of the first cell is/are the candidate cell and/or the candidate frequency in the process of cell selection and/or cell reselection of the reduced capability terminal equipment; or,
when the cell information does not include the first indication information, the fourth determining module determines that the first cell and/or the frequency of the first cell is/are in a barred state or a unreserved state for the reduced capability terminal equipment and the first cell and/or the frequency of the first cell is/are not the candidate cell and/or the candidate frequency in the process of cell selection and/or cell reselection of the reduced capability terminal equipment.
43. The apparatus according to supplement 38, wherein the cell information includes or does not include relevant information of the reduced capability terminal equipment, and the determining unit includes:
a fifth determining module configured to determine that the first cell and/or the frequency of the first cell is/are the candidate cell and/or the candidate frequency in the process of cell selection and/or cell reselection of the reduced capability terminal equipment when the cell information includes the relevant information, and determine that the first cell and/or the frequency of the first cell is/are not the candidate cell and/or the candidate frequency in the process of cell selection and/or cell reselection of the reduced capability terminal equipment when the cell information does not include the relevant information.
44. The apparatus according to supplement 43, wherein the relevant information includes at least one piece of access resource information of the reduced capability terminal equipment, system information related to the reduced capability terminal equipment, information indicating relevant PLMN of the reduced capability terminal equipment, search space information or control resource set information of the reduced capability terminal equipment, and bandwidth information of the reduced capability terminal equipment.
45. The apparatus according to any one of supplements 38-44, wherein the first cell is a second cell to which the cell information corresponds and/or a cell other than the second cell, and the frequency of the first cell is a first frequency of the second cell and/or a frequency other than the first frequency.

46. The apparatus according to supplement 45, wherein the other cell includes at least one other cell, and the other frequency includes at least one other frequency.
47. The apparatus according to any one of supplements 38-46, wherein the cell information further includes at least one piece of second indication information, third indication information, fourth indication information and fifth indication information, the second indication information indicating whether the first cell and/or the frequency of the first cell is/are in a barred state;
the third indication information indicating whether the first cell and/or the frequency of the first cell is/are reserved for use by an operator;
the fourth indication information indicating whether the first cell and/or the frequency of the first cell is/are reserved for other use;
and the fifth indication information indicating whether the first cell and/or the frequency of the first cell is/are reserved for use in the future.
48. The apparatus according to any one of supplements 38-47, wherein the terminal equipment is the reduced capability terminal equipment.
49. The apparatus according to supplement 47, wherein the determining unit determines that the first cell and/or the frequency of the first cell is/are the candidate cell and/or the candidate frequency in the process of cell selection and/or cell reselection of the reduced capability terminal equipment when the second indication information indicates that the first cell and/or the frequency of the first cell is/are not in a barred state and it is determined that the first cell and/or the frequency of the first cell is/are in a reserved state for the reduced capability terminal equipment.
50. The apparatus according to supplement 38, wherein the cell information includes at least one of minimum received power, a minimum quality level, an offset and maximum transmit power configured for the reduced capability terminal equipment.
51. The apparatus according to supplement 50, wherein the determining unit further includes:
a calculating module configured to calculate a parameter value indicating cell quality; and
a sixth determining module configured to determine that the first cell and/or the frequency of the first cell is/are not the candidate cell and/or the candidate frequency when the parameter value does not satisfy a predetermined condition.
52. The apparatus according to supplement 38, wherein the determining unit includes:
a seventh determining module configured to determine whether the first cell and/or the frequency of the first cell is/are the candidate cell and/or the candidate frequency in the process of cell selection and/or cell reselection of the reduced capability terminal equipment according to at least one piece of the second indication information, third indication information, fourth indication information and fifth indication information.
53. The apparatus according to supplement 47, wherein the determining unit is further configured to ignore the second indication information, third indication information, fourth indication information and fifth indication information.
54. The apparatus according to any one of supplements 38-53, wherein the cell information is carried by system information or a random access response message or a radio resource control reject message.
55. The apparatus according to any one of supplements 38-54, wherein the cell information corresponds to a type or a use scenario of the reduced capability terminal equipment, and/or the cell information is common for PLMN or specific for PLMN specific.
56. The apparatus according to any one of supplements 38-55, wherein the apparatus further includes:
a searching unit configured to search for at least two third cells of strongest signals, or determine a fourth cell with RSRP higher than a threshold,
and the acquiring unit acquires cell information transmitted by the third cell and/or the fourth cell.
57. An information transmission apparatus, applicable to a network device, the apparatus including:
a generating unit configured to generate cell information, the cell information being used by a terminal equipment to determine whether a first cell and/or a frequency of the first cell is/are a candidate cell and/or a candidate frequency in a process of cell selection and/or cell reselection of a reduced capability terminal equipment; and
a transmitting unit configured to transmit the cell information.

What is claimed is:

1. A cell selection or reselection apparatus, applicable to a terminal equipment, the apparatus comprising:
a receiver configured to receive, from a first cell, first indication information and second indication information, the first indication information indicating whether the first cell is in a barred state for a reduced capability terminal equipment, the second indication information indicating whether the first cell is in a barred state; and
processor circuitry configured to determine, according to the first indication information and the second indication information, whether the first cell is a candidate cell in a process of cell selection and/or cell reselection of a reduced capability terminal equipment,
wherein the reduced capability terminal equipment determines that the first cell is not the candidate cell in the process of cell selection and/or cell reselection for 300 seconds
when the second indication information indicating that the first cell is in a barred state, or
when the first indication information indicating that the first cell is in a barred state.
2. The apparatus according to claim 1, wherein the receiver is further configured to receive a first intra-frequency reselection parameter (intraFreqReselection) for the reduced capability terminal equipment.
3. The apparatus according to claim 1, wherein the receiver is further configured to receive information on whether a second frequency support the access of the reduced capability terminal equipment.
4. The apparatus according to claim 1, wherein the receiver is further configured to receive cell information includes or does not include relevant information of the reduced capability terminal equipment, and the processor circuitry configured to determine that the first cell is the candidate cell in the process of cell selection and/or cell reselection of the reduced capability terminal equipment when the cell information includes the relevant information, and
determine that the first cell is not the candidate cell in the process of cell selection and/or cell reselection of the reduced capability terminal equipment when the cell information does not include the relevant information.

5. The apparatus according to claim 4, wherein the relevant information includes at least one piece of access resource information of the reduced capability terminal equipment, system information related to the reduced capability terminal equipment, information indicating relevant PLMN of the reduced capability terminal equipment, search space information or control resource set information of the reduced capability terminal equipment, and bandwidth information of the reduced capability terminal equipment.

6. The apparatus according to claim 1, wherein the first cell is a second cell to which cell information corresponds and/or a cell other than the second cell.

7. The apparatus according to claim 6, wherein the other cell includes at least one other cell.

8. The apparatus according to claim 1, wherein the terminal equipment is the reduced capability terminal equipment.

9. The apparatus according to claim 1, wherein the receiver is further configured to receive cell information includes at least one of minimum received power, a minimum quality level, an offset and maximum transmit power configured for the reduced capability terminal equipment.

10. The apparatus according to claim 9, wherein the processor circuitry is further configured to:
calculate a parameter value indicating cell quality, and
determine that the first cell is not the candidate cell when the parameter value does not satisfy a predetermined condition.

11. The apparatus according to claim 1, wherein the receiver is configured to receive system information including cell information or a random access response message including the cell information or a radio resource control reject message including the cell information.

12. The apparatus according to claim 1, wherein the receiver is further configured to receive cell information corresponds to a type or a use scenario of the reduced capability terminal equipment, and/or the cell information is common for PLMN or specific for PLMN.

13. The apparatus according to claim 1, wherein the processor circuitry is further configured to:
control to search for at least two third cells of strongest signals, or determine a fourth cell with RSRP higher than a threshold, and
the receiver receives cell information transmitted by the third cell and/or the fourth cell.

14. An information transmission apparatus, applicable to a network device, the apparatus comprising:
processor circuitry configured to generate first indication information and second indication information, the first indication information indicating whether the first cell is in a barred state for the reduced capability terminal equipment, the second indication information indicating whether the first cell is in a barred state, the first indication information and the second indication information being used by a terminal equipment to determine whether the first cell is a candidate cell in a process of cell selection and/or cell reselection of a reduced capability terminal equipment,
wherein the first cell is not the candidate cell for the reduced capability terminal equipment in the process of cell selection and/or cell reselection for 300 seconds when the second indication information indicating that the first cell is in a barred state, or
when the first indication information indicating that the first cell is in a barred state; and
a transmitter configured to transmit the first indication information and second indication information.

* * * * *